(12) United States Patent
Surkov

(10) Patent No.: US 10,791,321 B2
(45) Date of Patent: *Sep. 29, 2020

(54) CONSTRUCTING A USER'S FACE MODEL USING PARTICLE FILTERS

(71) Applicant: Ditto Technologies, Inc., Oakland, CA (US)

(72) Inventor: Sergey Surkov, Foster City, CA (US)

(73) Assignee: Ditto Technologies, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,936

(22) Filed: Aug. 29, 2019

(65) Prior Publication Data

US 2020/0036961 A1 Jan. 30, 2020

Related U.S. Application Data

(63) Continuation of application No. 14/637,063, filed on Mar. 3, 2015, now Pat. No. 10,440,350.

(51) Int. Cl.
| | |
|---|---|
| *H04N 5/32* | (2006.01) |
| *H04N 13/275* | (2018.01) |
| *H04N 13/204* | (2018.01) |
| *G06T 7/579* | (2017.01) |
| *G06F 16/00* | (2019.01) |
| *G06T 17/00* | (2006.01) |
| *H04N 5/232* | (2006.01) |

(52) U.S. Cl.
CPC ........... *H04N 13/275* (2018.05); *G06F 16/00* (2019.01); *G06T 7/579* (2017.01); *G06T 17/00* (2013.01); *H04N 5/23219* (2013.01); *H04N 13/204* (2018.05); *G06T 2207/30201* (2013.01)

(58) Field of Classification Search
CPC . H04N 13/0275; H04N 5/23219; G06T 7/579
See application file for complete search history.

(56) References Cited

U.S. PATENT DOCUMENTS

| | | |
|---|---|---|
| 8,085,982 B1 | 12/2011 | Kim |
| 2005/0175219 A1 | 8/2005 | Yang |
| 2007/0091085 A1 | 4/2007 | Wang |
| 2007/0183653 A1 | 8/2007 | Medioni |
| 2009/0022364 A1 | 1/2009 | Swaminathan |

(Continued)

OTHER PUBLICATIONS

Closas et al., Improving Accuracy by Iterated Multiple Particle Filtering, Aug. 8, 2012, IEEE, Signal Processing Letters, vol. 19, No. 8, pp. 531-534.

*Primary Examiner* — Zhubing Ren
(74) *Attorney, Agent, or Firm* — Van Pelt, Yi & James LLP

(57) ABSTRACT

Constructing a user's face model using particle filters is disclosed, including: using a first particle filter to generate a new plurality of sets of extrinsic camera information particles corresponding to respective ones of a plurality of images based at least in part on a selected face model particle; selecting a subset of the new plurality of sets of extrinsic camera information particles corresponding to respective ones of the plurality of images; and using a second particle filter to generate a new plurality of face model particles corresponding to the plurality of images based at least in part on the selected subset of the new plurality of sets of extrinsic camera information particles.

18 Claims, 14 Drawing Sheets

(56) References Cited

U.S. PATENT DOCUMENTS

| | | |
|---|---|---|
| 2010/0195870 A1 | 8/2010 | Ai |
| 2011/0310110 A1 | 12/2011 | Lookingbill |
| 2012/0117084 A1* | 5/2012 | Tang ................. G06T 7/246 |
| | | 707/748 |
| 2012/0183238 A1 | 7/2012 | Savvides |
| 2013/0336583 A1 | 12/2013 | Ernst |
| 2015/0243031 A1* | 8/2015 | Narasimha ........... G06K 9/6256 |
| | | 382/103 |
| 2015/0363636 A1* | 12/2015 | Tate .................. G06K 9/00295 |
| | | 382/103 |

* cited by examiner

CONSTRUCTING A USER'S FACE MODEL USING PARTICLE FILTERS

CROSS REFERENCE TO OTHER APPLICATIONS

This application is a continuation of co-pending U.S. patent application Ser. No. 14/637,063 entitled CONSTRUCTING A USER'S FACE MODEL USING PARTICLE FILTERS filed Mar. 3, 2015 which is incorporated herein by reference for all purposes.

BACKGROUND OF THE INVENTION

Conventionally, a bundle adjustment technique can be used to construct a three-dimensional (3D) model of an object that appears in one or more images. For example, the images may comprise photos or frames from a video. However, the images input into the bundle adjustment technique may be blurry and may degrade the accuracy of the resulting 3D model of the object.

BRIEF DESCRIPTION OF THE DRAWINGS

Various embodiments of the invention are disclosed in the following detailed description and the accompanying drawings.

DETAILED DESCRIPTION

Figure 1:
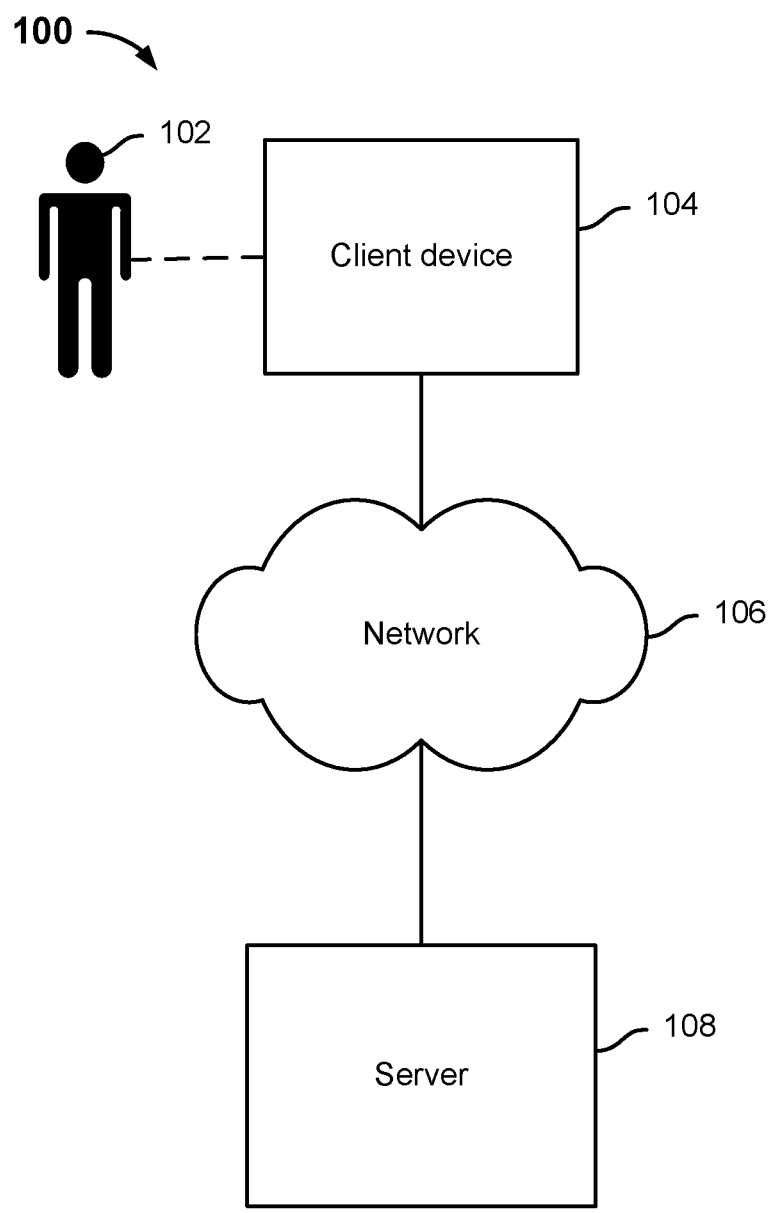
FIG. 1 is a diagram showing an embodiment of a system for performing constructing a user's face model using particle filters.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of constructing a user's face model using particle filters are described herein. In various embodiments, a set of images of a user's face at various orientations is obtained. For example, the set of images may include frames of a video recording of the user moving his or her head from side to side. In various embodiments, a first particle filter is used to obtain a three-dimensional (3D) model of the user's face that appears in the set of images. In various embodiments, a second particle filter is used to obtain a set of extrinsic camera information corresponding to each image of at least a subset of the set of images. In various embodiments, a "set of extrinsic camera information" corresponding to an image describes one or more rotation angles and also one or more translations that describe an orientation of the user's face in that image relative to the camera. For example, a set of extrinsic camera information may include three rotation angles and three translation values. In some embodiments, a set of extrinsic camera information includes one or more quaternions or rotation matrices and one or more translations. In various embodiments, one or more iterations of the first particle filter and one or more iterations of the second particle filter are alternately performed until a stop condition is met. After the stop condition is met, a 3D model of the user's face corresponding to the set of images can be determined from the particles generated by the last iteration of the first particle filter and a set of extrinsic camera information corresponding to each image of the set of images can be determined from the particles generated by the last iteration of the second particle filter for further processing.

FIG. 1 is a diagram showing an embodiment of a system for performing constructing a user's face model using particle filters. In the example, system 100 includes client device 104, network 106, and server 108. Network 106 includes high speed data networks and/or telecommunications networks. In some embodiments, client device 104 is configured to communicate to server 108 over network 106.

Client device 104 is configured to record or receive a set of recorded images corresponding to a user's head at various orientations. Examples of client device 104 may include a laptop computer, a desktop computer, a tablet device, a mobile device, a smart phone, and/or any computing device. For example, the set of recorded images may comprise a video or a series of snapshots. In some embodiments, client device 104 includes or is connected to a camera device. The camera device and/or a processor of client device 104 that is running an application can capture a set of images of the user's head as user 102 turns his or her head in different directions (e.g., as instructed through a user interface of the application). In various embodiments, the set of images is sent to server 108 for server 108 to process. In some embodiments, client device 104 includes a user interface through which the user may interact and view a playback associated with the images.

In various embodiments, server 108 is configured to receive a set of images sent from a client device such as client device 104. Server 108 is configured to search for a (e.g., optimal) representation (e.g., a mathematical 3D model) of the user's (e.g., user 102) face associated with a set of images using one particle filter. A "particle filter" comprises a searching technique that generates improved, new hypotheses/guesses (or also referred to as "particles") for a desired piece of information during each iteration of the particle filter by using one or more measurements and a previous set of particles. A particle filter may be performed for multiple iterations until a stop condition is met. In various embodiments, the particle filter used to determine the 3D model of the user's face is sometimes referred to as an "M particle filter." In various embodiments, each user face model particle corresponding to the set of images is sometimes referred to as an "M particle." Server 108 is also configured to search for (e.g., optimal) sets of extrinsic camera information corresponding to respective images of the set (e.g., a set of extrinsic information is specifically determined for each image of the set) using a second particle filter. In various embodiments, the particle filter used to determine the sets of extrinsic camera information corresponding to respective images of the set is sometimes referred to as an "E particle filter." In various embodiments, each set of extrinsic camera information particle corresponding to each image in the set of images is sometimes referred to as an "E particle."

Because the 3D model of the user's face corresponding to the set of images can be determined independently of the sets of extrinsic camera information corresponding to respective ones of the set of images, a separate particle filter can be used to determine the 3D model of the user's face and the sets of extrinsic camera information. In various embodiments, one or more iterations of the E particle filter are performed based on a selected initial user face model (M) particle to generate new sets of extrinsic camera information (E) particles corresponding to each image of the set of images. Then, an (e.g., optimal) E particle is selected from the sets of E particles corresponding to each image generated from the latest iteration of the E particle filter and one or more iterations of the M particle filter are performed based on the selected E particles corresponding to the respective images to generate new M particles corresponding to the set of images. An (e.g., optimal) M particle can be selected from the M particles generated from the latest iteration of the M particle filter corresponding to the set of images to use in the next iteration(s) of the E particle filter. Iterations of the E particle filter and the M particle filter can be alternately performed as such until a stop condition is met. After the stop condition is met, an M particle can be selected from the last set of M particles corresponding to the set of images to use as the 3D model of the user's face corresponding to the set of images and an E particle can be selected from the last set of E particles corresponding to each image of the set of images to use as the set of extrinsic camera information corresponding to that image. The 3D model of the user's face corresponding to the set of images and the set of extrinsic camera information corresponding to each image can be used in further processing, such as, for example, to transform 3D items (e.g., glasses frames, jewelry, makeup, accessories, etc.) to match the orientation of the user's face at each image.

By alternately performing two particle filters in which each particle filter selectively uses particles generated by the latest iteration of the other particle filter, the two particle filters may continually generate better particles or hypotheses by building off the increasingly better results of the other particle filter. In some embodiments, alternating between the two particle filters enables a search for local optima of a 3D model of a user's face and/or sets of extrinsic information, not necessarily the best solutions.

Figure 2:
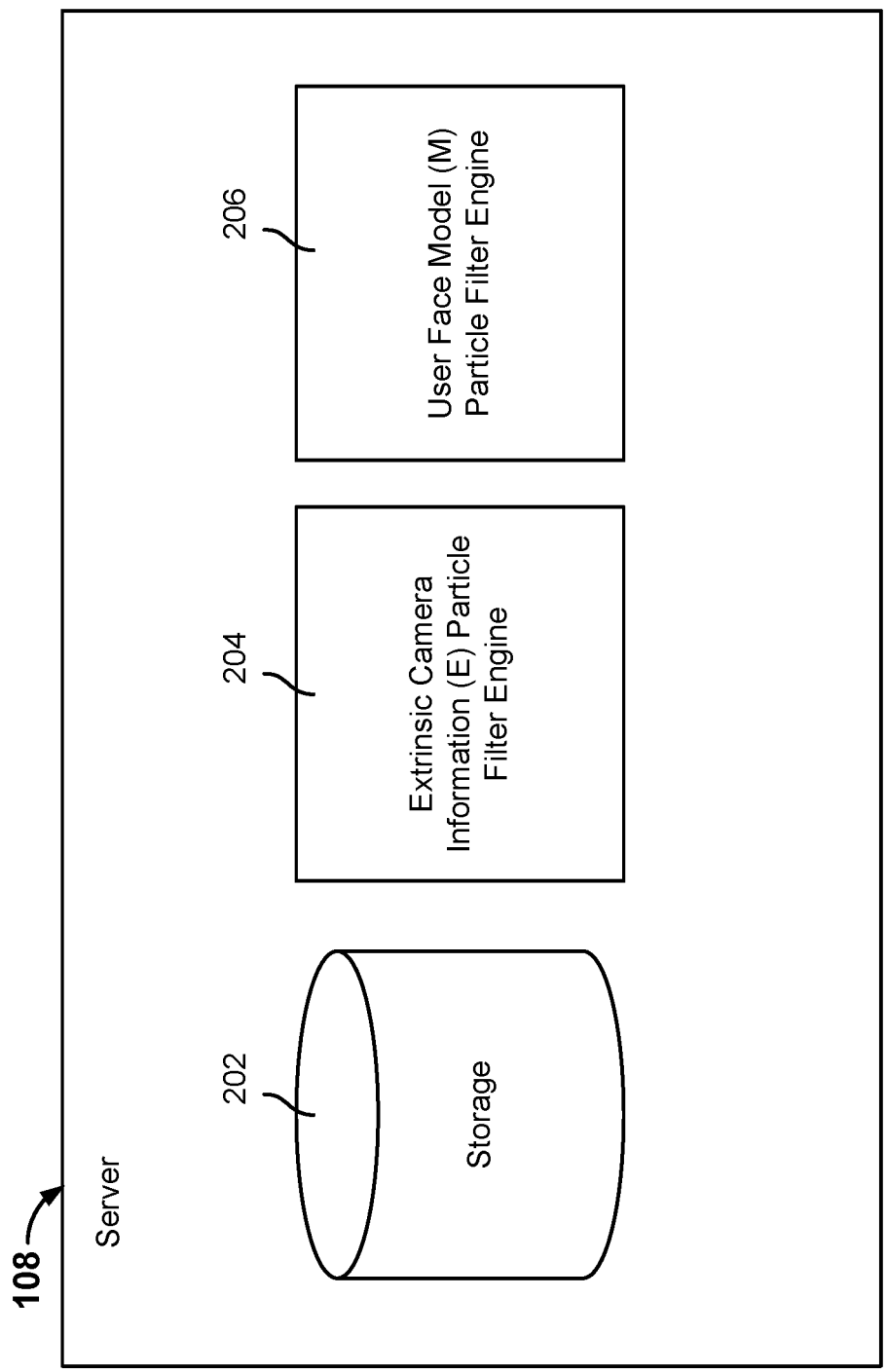
FIG. 2 is a diagram showing an embodiment of a server.

FIG. 2 is a diagram showing an embodiment of a server. In some embodiments, server 108 of system 100 of FIG. 1 is implemented using the example of FIG. 2. In the example, the server includes storage 202, extrinsic camera information (E) particle filter engine 204, and user face model (M) particle filter engine 206. Each of extrinsic camera information (E) particle filter engine 204 and user face model (M) particle filter engine 206 can be implemented using hardware and/or software.

Storage 202 is configured to store data. In some embodiments, storage 202 stores one or more sets of images and any associated data. For example, each set of images is associated with a video or a series of snapshots of various orientations of a user's face. In some embodiments, storage 202 is configured to store previously/historically determined 3D user face models associated with historical users. In some embodiments, the previously determined 3D user face models may be determined from sets of images using a particle filter as described herein or determined based on other data and/or determined using other techniques. In some embodiments, storage 202 is configured to store one or more generic 3D user face models. In some embodiments, storage 202 is configured to store previously determined sets of extrinsic camera information. In some embodiments, the previously determined sets of extrinsic camera information may be determined from sets of images using a particle filter as described herein or determined based on other data and/or determined using other techniques. In some embodiments, storage 202 is configured to store new M particles generated by each iteration of an M particle filter. In some embodiments, storage 202 is configured to store new E particles generated by each iteration of an E particle filter. In some embodiments, storage 202 is configured to store one or more stop conditions associated with ceasing performing iterations of the M particle filter and/or the E particle filter. Example stop conditions include when a predetermined number of iterations of the E and/or M particle filter have been reached, when the E and/or M particles cannot be significantly modified, and/or when the weights determined for the E and/or M particles approach a predetermined value. In some embodiments, storage 202 is configured to store a 3D model of a user's face selected from the last set of M particles determined for a set of images and to store a set of extrinsic camera information selected from the last set of E particles determined for each image of the set of images.

Extrinsic camera information (E) particle filter engine 204 is configured to perform one or more iterations of a particle filter for generating sets of extrinsic camera information (E) particles corresponding to each image of a set of images. In various embodiments, E particle filter engine 204 is configured to select an initial 3D model of a face (e.g., from storage 202). In some embodiments, the initial 3D model of the face is received (e.g., predetermined). For example, the initial 3D user face model may comprise a previously determined 3D model of a historical user's face or a 3D model of a generic face. E particle filter engine 204 is configured to perform an iteration of the E particle filter using the selected (initial) 3D model of the face. In some embodiments, performing an iteration of the E particle filter using the selected (initial) 3D model of the face includes generating a set of (e.g., 50) E particles corresponding to each image of a set of images, generating measurements using the set of E particles and the selected (initial) 3D model of the face corresponding to the set of images, assigning weights to the set of E particles corresponding to each image of the set of images using the measurements, performing resampling of the set of E particles to generate a resampled set of (e.g., 50) E particles corresponding to each image of the set of images based on the weights (e.g., resampling includes selectively reproducing particles that were assigned relatively higher weights), and modifying the resampled set of (e.g., 50) E particles to generate a new set of (e.g., 50) E particles corresponding to each image of the set of images.

In some embodiments, after extrinsic camera information (E) particle filter engine 204 performs a predetermined number of iterations of the E particle filter, E particle filter engine 204 sends a message to user face model (M) particle filter engine 206 to indicate to user face model (M) particle filter engine 206 to perform a subsequent predetermined number of iterations of the M particle filter. In some embodiments, E particle filter engine 204 is configured to select an (e.g., optimal) E particle from the new set of E particles corresponding to each image generated by the latest iteration of the E particle filter to send to M particle filter engine 206. In some embodiments, E particle filter engine 204 is configured to receive a message from M particle filter engine 206 that indicates for E particle filter engine 204 to perform a subsequent predetermined number of iterations of the E particle filter. In some embodiments, E particle filter engine 204 is configured to select (or otherwise obtain) an (e.g., optimal) M particle from the new set of M particles generated by the latest iteration of the M particle filter to use to perform the subsequent iteration of the E particle filter.

User face model (M) particle filter engine 206 is configured to perform one or more iterations of a particle filter for generating 3D models of a user's face (M) particles corresponding to a set of images. In various embodiments, M particle filter engine 206 is configured to select an initial set of extrinsic camera information corresponding to each image of the set of images (e.g., from storage 202). In some embodiments, the initial 3D set of extrinsic camera information corresponding to each image is received (e.g., predetermined). For example, the set of extrinsic camera information corresponding to each image may comprise a previously determined set of extrinsic camera information corresponding to an image determined by E particle filter engine 204. M particle filter engine 206 is configured to perform an iteration of the M particle filter using the selected (initial) set of extrinsic camera information corresponding to each image. In some embodiments, performing an iteration of the M particle filter using the selected (initial) set of extrinsic camera information corresponding to each image includes generating a set of (e.g., 30) M particles corresponding to a set of images, generating measurements for the set of M particles corresponding to the set of images using the set of M particles and the selected set of extrinsic camera information corresponding to each image, assigning weights to the set of M particles corresponding to the set of images using the measurements and the selected (initial) set of extrinsic camera information corresponding to the set of images, performing resampling of the set of M particles to generate a resampled set of (e.g., 30) M particles corresponding to the set of images based on the weights (e.g., resampling includes selectively reproducing particles that were assigned relatively higher weights), and modifying the resampled set of (e.g., 30) M particles to generate a new set of (e.g., 30) M particles corresponding to the set of images.

In some embodiments, after user face model (M) particle filter engine 206 performs a predetermined number of iterations of the M particle filter, M particle filter engine 206 sends a message to extrinsic camera information (E) particle filter engine 204 to indicate to extrinsic camera information (E) particle filter engine 204 to perform a subsequent predetermined number of iterations of the E particle filter. In some embodiments, M particle filter engine 206 is configured to select an (e.g., optimal) M particle from the new set of M particles corresponding to the set of images to send to E particle filter engine 204. In some embodiments, M particle filter engine 206 is configured to receive a message from E particle filter engine 204 that indicates for M particle filter engine 206 to perform a subsequent predetermined number of iterations of the M particle filter. In some embodiments, M particle filter engine 206 is configured to select (or otherwise obtain) an (e.g., optimal) E particle from the new set of E particles corresponding to each image generated by the latest iteration of the E particle filter to use to perform the subsequent iteration of the M particle filter.

Figure 3:
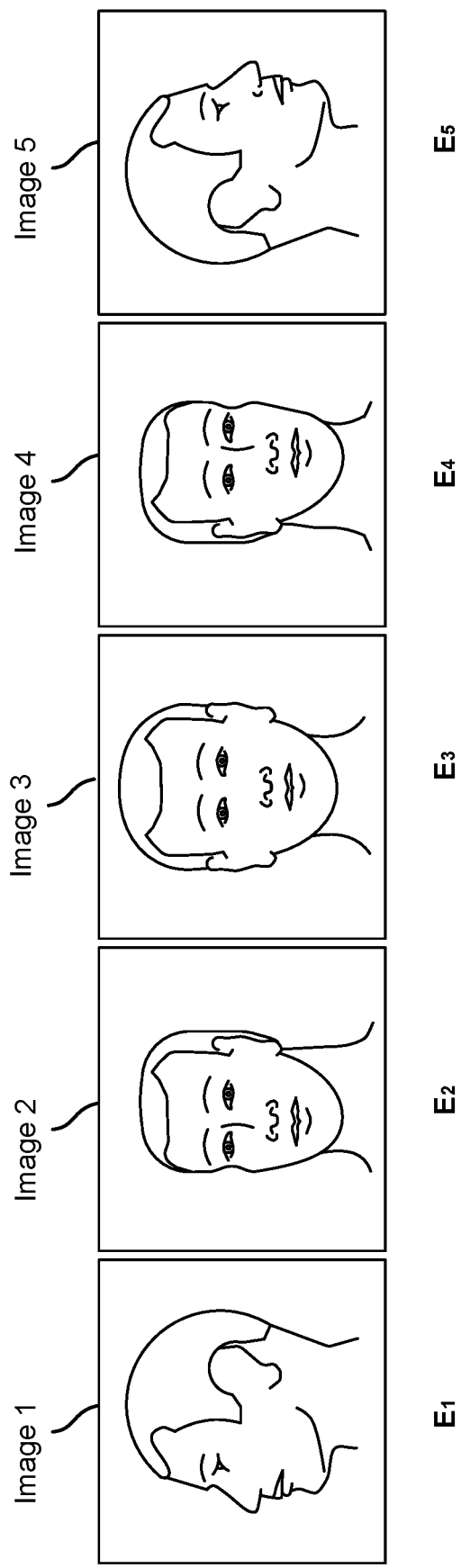
FIG. 3 is a diagram showing several images included in a set of images.

FIG. 3 is a diagram showing several images included in a set of images. In the example, Images 1, 2, 3, 4, and 5 are included in a recorded set of images of a user's face at various different orientations relative to the camera. For example, Images 1, 2, 3, 4, and 5 were recorded in a chronological order in which Image 1 was recorded the earliest, Image 2 was recorded second earliest, Image 3 was recorded third earliest, Image 4 was recorded fourth earliest, and Image 5 was recorded last. In various embodiments, adjacent images (e.g., images that were recorded consecutively, one after the other in time) may be referred to as "neighboring images."

Using the techniques described herein, a 3D model of the user's face, M, which describes the user's face that appears in the set of images, Images 1, 2, 3, 4, and 5 can be determined for the set of images using an M particle filter. Using the techniques described herein, a set of extrinsic camera information, E, which describes the orientation and translation of the user's face in an individual image can be determined for that image using an E particle filter. As shown in the example, each image is identified by a number 1 through 5 for which a corresponding set of extrinsic camera information, E, which includes the number associated with the image as its subscript (e.g., $E_1$ corresponds to Image 1, $E_2$ corresponds to Image 2, etc.) can be determined using the E particle filter. For example, $E_1$ may be used to transform a 3D model of the user's face, M, corresponding to the set of images in 3D space to match the orientation and translation of the user's face that is shown in Image 1.

Figure 4:
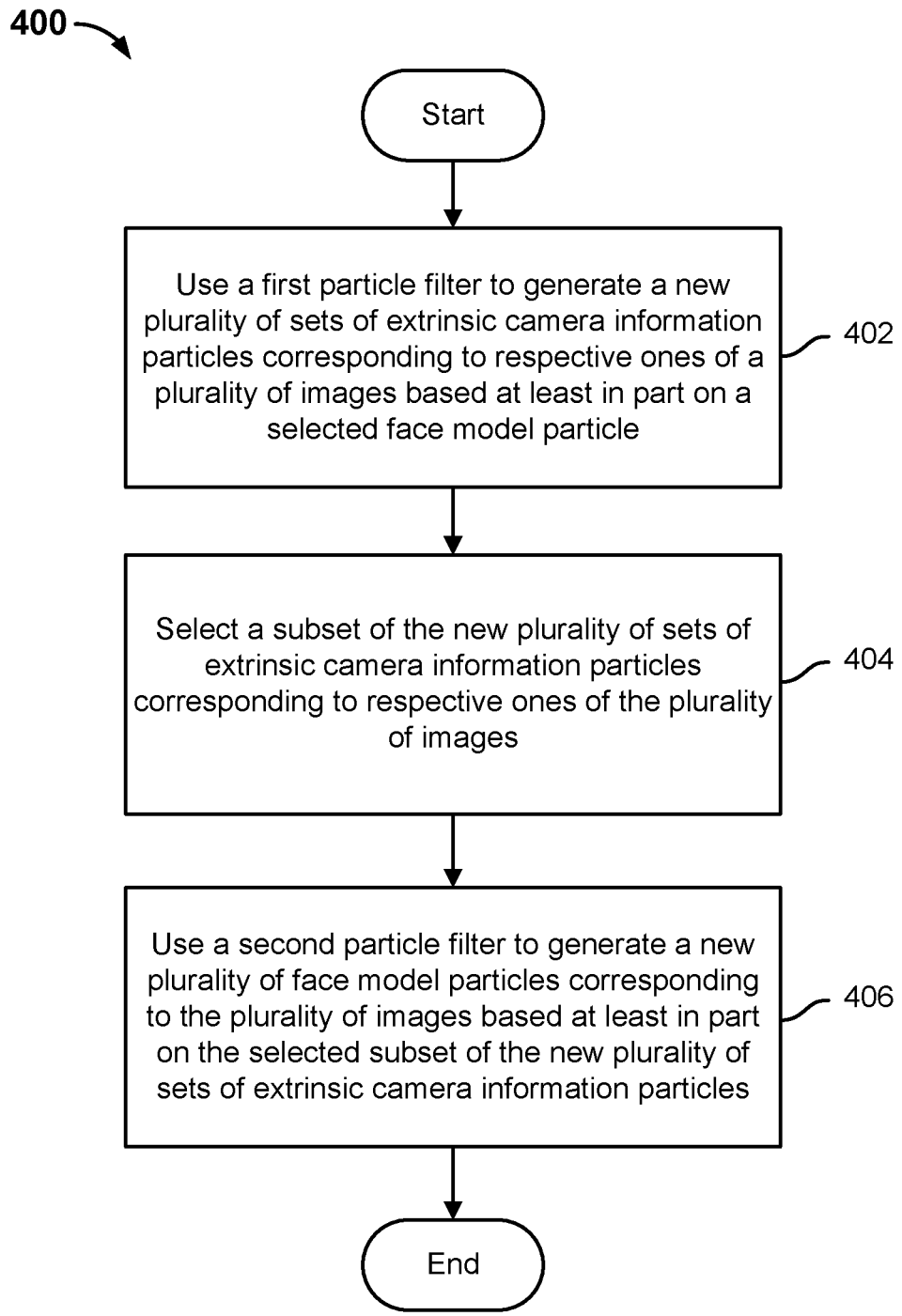
FIG. 4 is a flow diagram showing an embodiment of a process for constructing a user's face model using particle filters.

FIG. 4 is a flow diagram showing an embodiment of a process for constructing a user's face model using particle filters. In some embodiments, process 400 is implemented at system 100 of FIG. 1.

At 402, a first particle filter is used to generate a new plurality of sets of extrinsic camera information particles corresponding to respective ones of a plurality of images based at least in part on a selected face model particle. The plurality of images comprises a series of images of a user's face at various angles/orientations. For example, the plurality of images was captured as the user was turning his or her head in different directions (e.g., from side to side) relative to the camera. As described above, a "particle" refers to a hypothesis or a guess for a desired piece of information.

A set of extrinsic camera information, which is sometimes referred to as "E," is desired to be found for each of at least a subset of images. A hypothesis or a guess for the appropriate set of extrinsic camera information, E, for each image is sometimes referred to as an "E particle." The particle filter that is used to search for the appropriate set of extrinsic camera information for each image is sometimes referred to as an "E" particle filter. The E particle filter is configured to generate a (improved) set of E particles for each image over each subsequent iteration.

In some embodiments, a predetermined number of initial E particles is determined for each image. For example, the predetermined number of E particles for each image is 50. For example, the initial E particles determined for each image may comprise samples from a distribution of previously determined sets of extrinsic camera information. For example, a parametric distribution is fitted to historical sets of extrinsic camera information, and samples from it are used as the initial E particles for an image. In various embodiments, a selected face model particle comprises an initial face model that is assumed to be fixed in an iteration of the E particle filter and is usable to generate measurements/observations in an iteration of the E particle filter. In some embodiments, the initial face model comprises a 3D model of a generic face. In some embodiments, the initial face model comprises a previously determined 3D model of a historical user's face corresponding to a historical plurality of images. One or more iterations of the E particle filter are performed using the selected face model and a new set of E particles is generated for each image after each iteration. In various embodiments, the same (e.g., predetermined) number of new E particles that were included in the initial set of E particles is generated for each image in each iteration of performing the E particle filter.

At 404, a subset of the new plurality of sets of extrinsic camera information particles corresponding to respective ones of the plurality of images is selected. In various embodiments, one set of extrinsic camera information (E) particle of the new E particles that were determined for each image during the latest iteration of the E particle filter at step 402 is selected. For example, if there were 50 new E particles generated for each image of the set, then one out of the 50 E particles is selected for each image. Furthermore, if there were 10 images, then 10 total E particles, one for each image, would be selected.

At 406, a second particle filter is used to generate a new plurality of face model particles corresponding to the plurality of images based at least in part on the selected subset of the new plurality of sets of extrinsic camera information particles. A 3D model of a user's face, which is sometimes referred to as "M," is desired to be found for the plurality of images. A hypothesis or a guess for the appropriate 3D model of the user's face, M, for the plurality of images is sometimes referred to as an "M particle." The particle filter that is used to search for the appropriate 3D model of the user's face for the plurality of images is sometimes referred to as an "M" particle filter. The M particle filter is configured to generate a (improved) set of M particles for the plurality of images over each subsequent iteration.

In some embodiments, a predetermined number of initial M particles are determined for the plurality of images. For example, the predetermined number of M particles for the plurality of images is 30. For example, the initial M particle determined for the plurality of images may be selected from a distribution of previously determined 3D models of previous users' faces corresponding to one or more previous pluralities of images. In various embodiments, the M particle filter can assume that the E particles corresponding to respective ones of the plurality of images selected at step 404 are fixed and are usable to generate measurements/observations in an iteration of the M particle filter. One or more iterations of the M particle filter are performed using the E particles corresponding to respective ones of the plurality of images selected at step 404 and a new set of M particles is generated for the plurality of images after each iteration. In various embodiments, the same (e.g., predetermined) number of new M particles that were included in the initial set of M particles is generated for the plurality of images in each iteration of performing the M particle filter.

In some embodiments, an M particle is selected from the new set of M particles generated at step 406 and input into the E particle filter for subsequent one or more iterations of processing. In each of these subsequent iteration(s) of processing, the E particle filter would generate a new set of E particles corresponding to each image using the selected M particle and a previously determined set of E particles for each image. Then, an E particle can be selected from the new set of E particles corresponding to each image from the latest iteration of the E particle filter and input into the M particle filter for a subsequent iteration of processing. Iterations of the M particle filter and the E particle filter may alternate in this manner until a stop condition is reached. For example, three iterations of the M particle filter can be followed by four iterations of the E particle filter until a stop condition is reached. After the stop condition is reached, an M particle is determined from the set of M particles generated by the last iteration of the M particle filter to use as the 3D model of the user's face corresponding to the plurality of images. Furthermore, after the stop condition is reached, an E particle is determined from the set of E particles generated by the last iteration of the E particle filter for each image to use as the set of extrinsic camera information corresponding to that image. For example, after the stop condition is reached, an M particle is determined to use as the 3D model of the user's face corresponding to the plurality of images by computing a weighted average of at least a subset of the set of M particles generated by the last iteration of the M particle filter. In another example, an M particle is determined to be used as the 3D model of the user's face corresponding to the plurality of images by selecting an M particle of the set of M particles generated by the last iteration of the M particle filter with the highest weight. Similar example techniques can be used to determine an E particle to use as the set of extrinsic camera information corresponding to each image.

Figure 5:
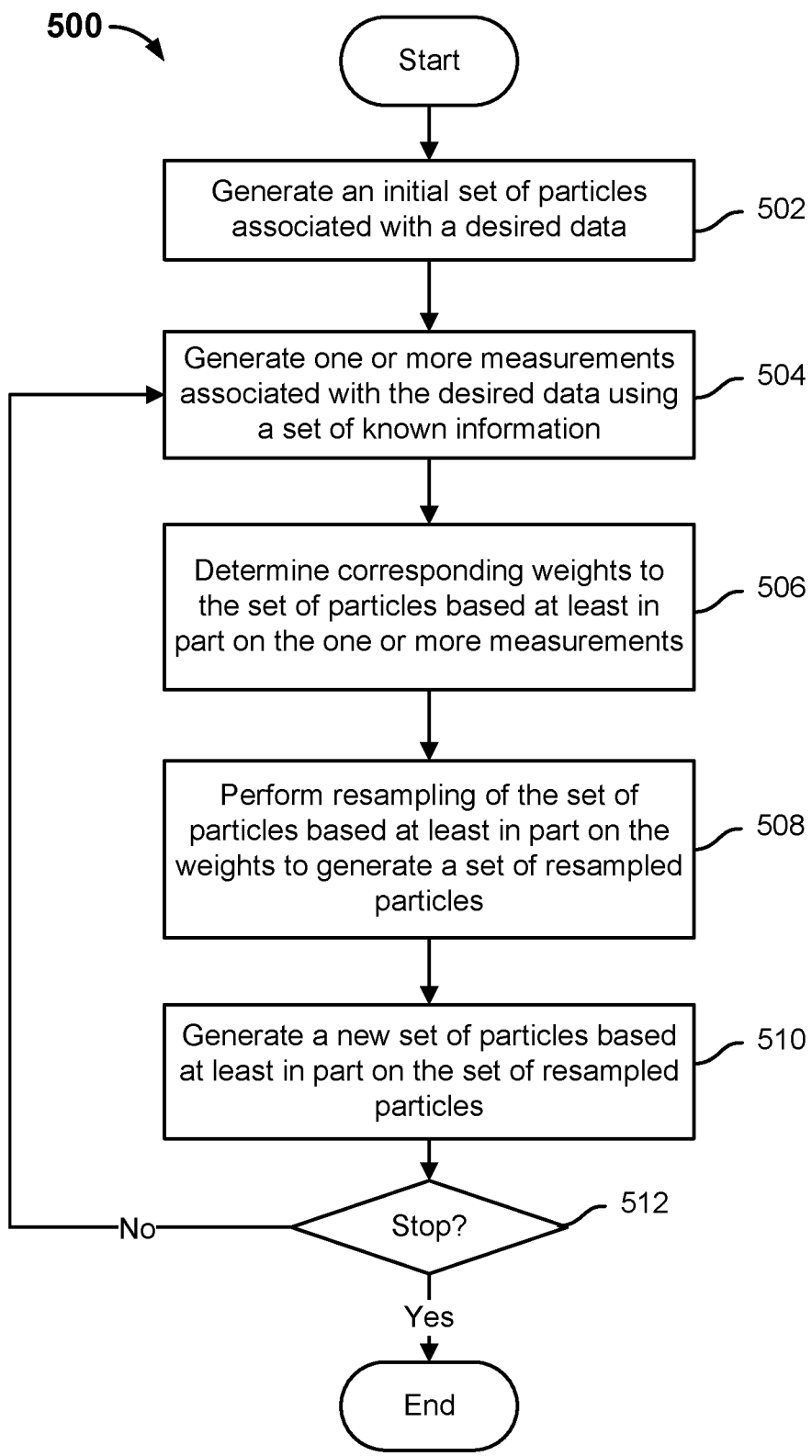
FIG. 5 is a flow diagram showing an example of a process of a general particle filter.

FIG. 5 is a flow diagram showing an example of a process of a general particle filter. In some embodiments, process 500 is implemented at system 100 of FIG. 1. In some embodiments, step 402 of process 400 of FIG. 4 can be implemented, at least in part, using process 500. In some embodiments, step 406 of process 400 of FIG. 4 can be implemented, at least in part, using process 500.

Process 500 describes an example process of executing a general particle filter. Each particle represents a hypothesis or a guess of a desired piece of information. As described with process 500, a particle filter may cycle through one or more iterations, where each iteration uses the results from the previous iteration to generate potentially better particles for the desired piece of information.

At 502, an initial set of particles associated with a desired data is generated. An initial set of particles for a desired piece of data can be generated at random and/or from historical data. For example, the desired piece of data can be the location of an object and each particle may comprise a hypothesis regarding the location of the object.

At 504, one or more measurements associated with the desired data are generated using a set of known information. One or more measurements are generated based on the desired data relative to a set of known information. For example, if the desired piece of data is the location of the object and the environment in which the object is located is known, then one or more measurements can be taken of the current location of the object relative to the known environment. For example, such measurements may include the distance between the current location of the object and one or more features of the known environment.

At 506, weights corresponding to the set of particles are determined based at least in part on the one or more measurements. A weight or a score can be determined for each particle based on how close the particle is to the measurements. Generally, the closer the particle is to the measurements, the more likely the particle is the desired data, and therefore, the higher the weight is assigned to the particle. Conversely, the further the particle is away from the measurements, the more likely the particle is not the desired data, and therefore, the lower the weight is assigned to the particle. For example, particles that comprise hypotheses of the location of an object in a known environment can be weighted based on how close the particles are to the measurements. Those particles that are close to the measurements, and are more likely indicative of the actual location of the object, are given higher weights.

At 508, resampling of the set of particles is performed based at least in part on the weights to generate a set of resampled particles. The set of particles is resampled based on the weights determined for the particles. Resampling includes removing all particles and creating new copies of a subset of the particles associated with the highest weights to generate the same number of particles that there were prior to the resampling. As such, a particle with a higher weight may be reproduced more than once while a particle with a low weight may not be reproduced at all. For example, particles that comprise hypotheses of the location of an object in a known environment that are assigned higher weights are reproduced while particles with lower weights are eliminated. Such resampling may also sometimes be referred to as "weighted sampling with replacement."

At 510, a new set of particles is generated based at least in part on the set of resampled particles. At least some of the resampled particles are modified (e.g., within a given tolerance) to create a new set of particles from the resampled particles. Modifying the resampled particles adds variability into the particles to potentially improve them (e.g., cause them to be closer to the desired data). All of the new particles have the same weight again.

At 512, it is determined whether another iteration of the particle filter is to be performed. If a stop condition has not been met, then another iteration is performed at step 504 using the new set of particles. Otherwise, if a stop condition has been met, process 500 ends.

Figure 6:
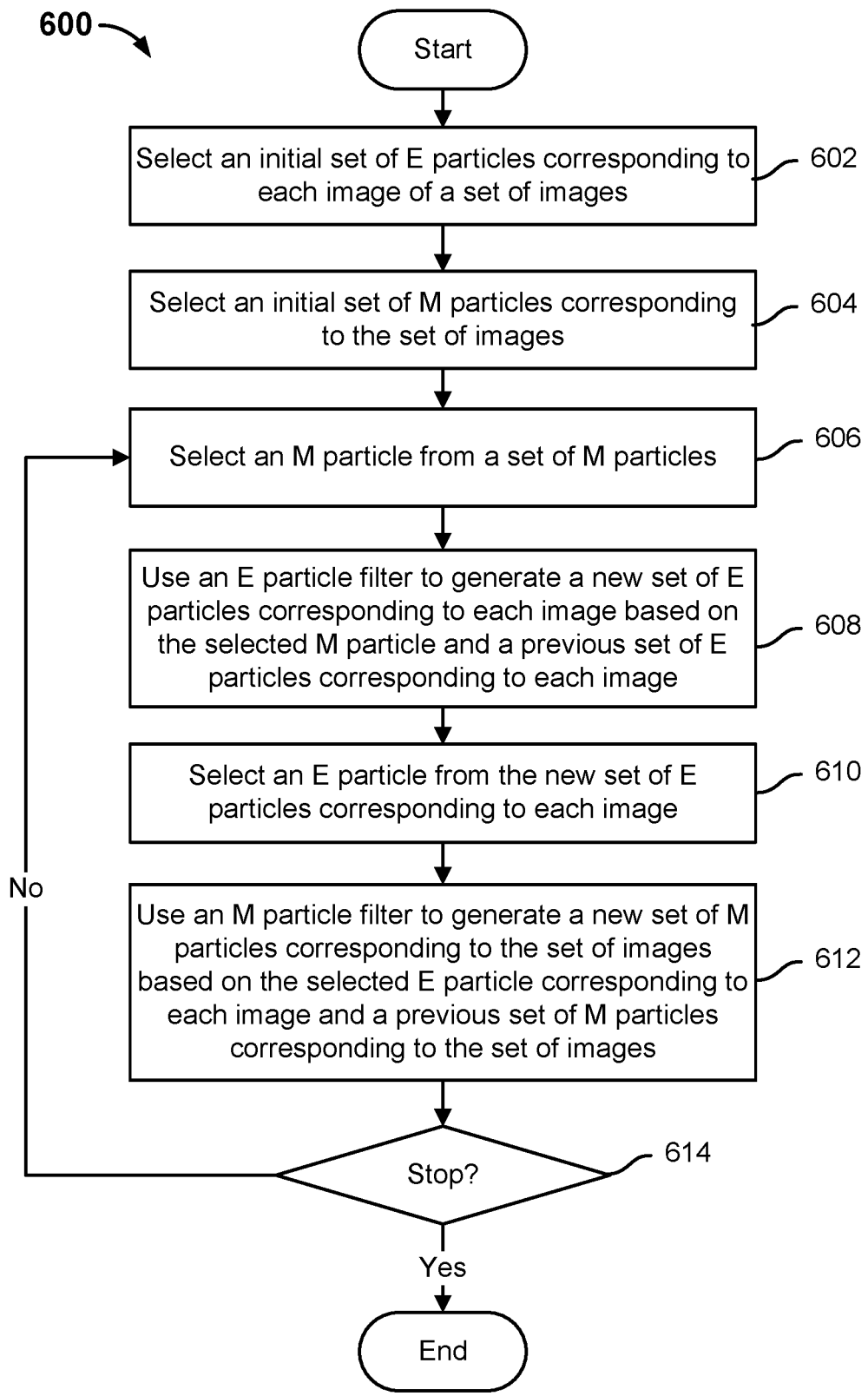
FIG. 6 is a flow diagram showing an example of a process of constructing a user's face model using particle filters.

FIG. 6 is a flow diagram showing an example of a process of constructing a user's face model using particle filters. In some embodiments, process 600 is implemented at system 100 of FIG. 1. In some embodiments, process 400 of FIG. 4 can be implemented, at least in part, using process 600.

Process 600 describes an example process of alternately executing two particle filters, one particle filter (the "M" particle filter) to determine a 3D model of a user's face associated with a set of images and the other particle filter (the "E" particle filter) to determine a set of extrinsic camera information corresponding to each image of the set of images. Furthermore, process 600 describes that at least a subset of the output of one particle filter can be input into the other particle filter and vice versa.

At 602, an initial set of E particles corresponding to each image of a set of images is selected. In some embodiments, an initial set of E particles corresponding to each image can be randomly generated from a historically determined distribution.

At 604, an initial set of M particles corresponding to the set of images is selected. In some embodiments, an initial set of M particles corresponding to the set of images can be randomly generated from a historically determined distribution.

At 606, an M particle is selected from the set of M particles. In some embodiments, an M particle is selected from the most recent set of M particles based on a set of criteria. For example, the M particle with the highest score/weight is selected. In another example, a weighted average is computed based on the set of M particles to generate the selected M particle. Prior to the first iteration of the M particle filter, the most recent set of M particles comprises the initial set of M particles. If the M particle filter has been executed over at least one iteration, then the most recent set of M particles comprises the set of M particles generated by the last iteration of the M particle filter.

At 608, an E particle filter is used to generate a new set of E particles corresponding to each image based on the selected M particle and a previous set of E particles corresponding to each image. The M particle selected at step 606 is to be used as a "fixed" M particle or a "fixed" 3D model of the user's face that is used to evaluate or assign scores/weights to a previous set of E particles corresponding to each image in an iteration of the E particle filter. The weighted E particles are then resampled and a new set of E particles corresponding to each image is generated from the resampled E particles. One or more iterations of the E particle filter may be performed at step 608.

At 610, an E particle is selected from the set of E particles corresponding to each image. In some embodiments, an E particle is selected from the most recent set of E particles corresponding to each image based on a set of criteria. For example, the E particle corresponding to each image with the highest score/weight is selected. In another example, a weighted average is computed based on the set of M particles to generate the selected M particle.

At 612, an M particle filter is used to generate a new set of M particles corresponding to the set of images based on the selected E particle corresponding to each image and a previous set of M particles corresponding to the set of images. The E particles corresponding to respective images selected at step 610 are to be used as "fixed" E particles or "fixed" sets of extrinsic camera information that are used to evaluate or assign scores/weights to a previous set of M particles corresponding to the set of images in an iteration of the M particle filter. One or more iterations of the M particle filter may be performed at step 612.

At 614, it is determined whether a stop condition is met. In the event that a stop condition is met, the E and M particle filters cease to perform any subsequent iterations and process 600 ends. Otherwise, in the event that a stop condition is not met, control is returned to step 606, at which an M particle is selected from the most recent set of M particles. In a first example, a stop condition comprises the completion of a predetermined total number of iterations of the M particle filter and the E particle filter. In a second example, a stop condition comprises detecting less than a predetermined change between the E particles and M particles generated from consecutive iterations of the E particle filter or the M particle filter, respectively.

Figure 7A:
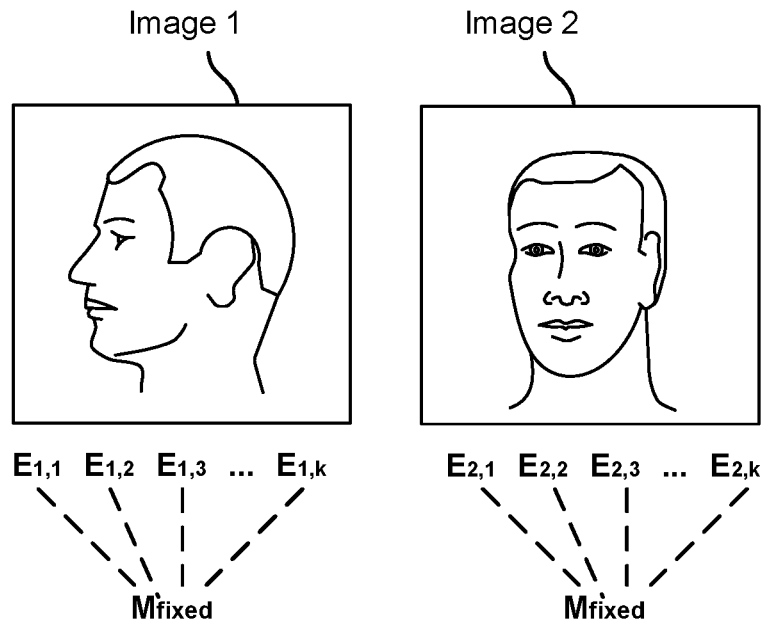
FIG. 7A and FIG. 7B show visual representations of examples of an iteration of an E particle filter and an iteration of an M particle filter, respectively.
Figure 7B:
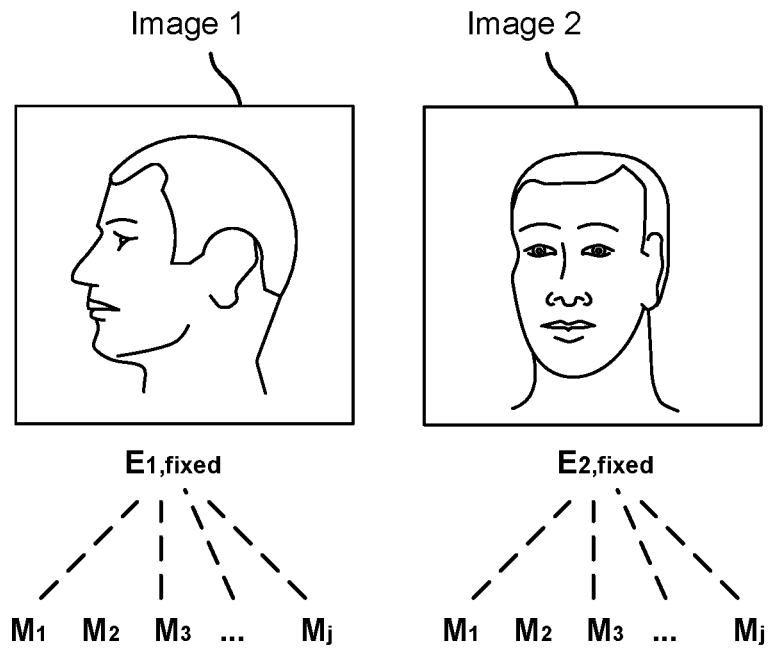

FIG. 7A and FIG. 7B show visual representations of examples of an iteration of an E particle filter and an iteration of an M particle filter, respectively. In FIG. 7A, an iteration of an E particle filter is depicted for two images, Image 1 and Image 2, in a set of images (the set of images may include other images that are not shown). In an iteration of the E particle filter, a set of k (e.g., k=50) E particles is generated for each of Image 1 and Image 2. The E particles generated for Image 1 include $E_{1,1}$, $E_{1,2}$, $E_{1,3}$, . . . , and $E_{1,k}$ and the E particles generated for Image 2 include $E_{2,1}$, $E_{2,2}$, $E_{2,3}$, . . . , and $E_{2,k}$. An M particle, Mixed, is selected to serve as a fixed 3D model of a face in the iteration of the E particle filter. For example, if the M particle filter has not executed before, then the M particle can be a 3D model of a generic face but if the M particle filter has been executed for at least one iteration, then the M particle can be selected from the set of M particles generated by the last iteration of the M particle filter. In an iteration of the E particle filter, measurements can be generated for each of Image 1 and Image 2, as will be described in further detail below. Also in this iteration of the E particle filter, each E particle corresponding to each of Image 1 and Image 2 can be assigned a weight or a score based on measurements determined from evaluating the E particle in light of $M_{fixed}$. The weighted E particles corresponding to each of Image 1 and Image 2 are resampled in this iteration of the E particle filter, and a new k (e.g., k=50) E particles are generated for each of Image 1 and Image 2. An (e.g., optimal) E particle corresponding to each of Image 1 and Image 2 can be selected and input into the M particle filter for a subsequent iteration of the M particle filter.

In FIG. 7B, an iteration of an M particle filter is depicted for two images in a set of images (the set of images may include other images that are not shown). In an iteration of the M particle filter, a set of j (e.g., j=30) M particles is generated for the set of images including Image 1 and Image 2. The M particles generated for the set of images include $M_1$, $M_2$, $M_3$, . . . , and $M_j$. An E particle, $E_{1,fixed}$, can be selected for Image 1 to serve as a fixed set of extrinsic camera information for Image 1 in the iteration of the M particle filter and E particle, $E_{2,fixed}$, can be selected for Image 2 to serve as a fixed set of extrinsic camera information for Image 2 in the iteration of the M particle filter. For example, if the E particle filter has not executed before, then the $E_{1,fixed}$ can be a historically determined set of extrinsic information but if the E particle filter has been executed for at least one iteration, then the $E_{1,fixed}$ can be selected from the set of E particles generated for Image 1 in the last iteration of the E particle filter and $E_{2,fixed}$ can be selected from the set of E particles generated for Image 2 in the last iteration of the E particle filter. In an iteration of the M particle filter, measurements can be generated for each of Image 1 and Image 2, as will be described in further detail below. Also in this iteration of the M particle filter, each M particle corresponding to the set of images including Image 1 and Image 2 can be assigned a weight or a score based on measurements determined by evaluating the M particle in light of $E_{1,fixed}$ and $E_{2,fixed}$, respectively. The weighted M particles corresponding to the set of images including Image 1 and Image 2 are resampled in this iteration of the M particle filter, and a new j (e.g., j=30) M particles are generated for the set of images including Image 1 and Image 2. An (e.g., optimal) M particle corresponding to the set of images including Image 1 and Image 2 can be selected and input into the E particle filter for a subsequent iteration of the E particle filter.

Figure 8:
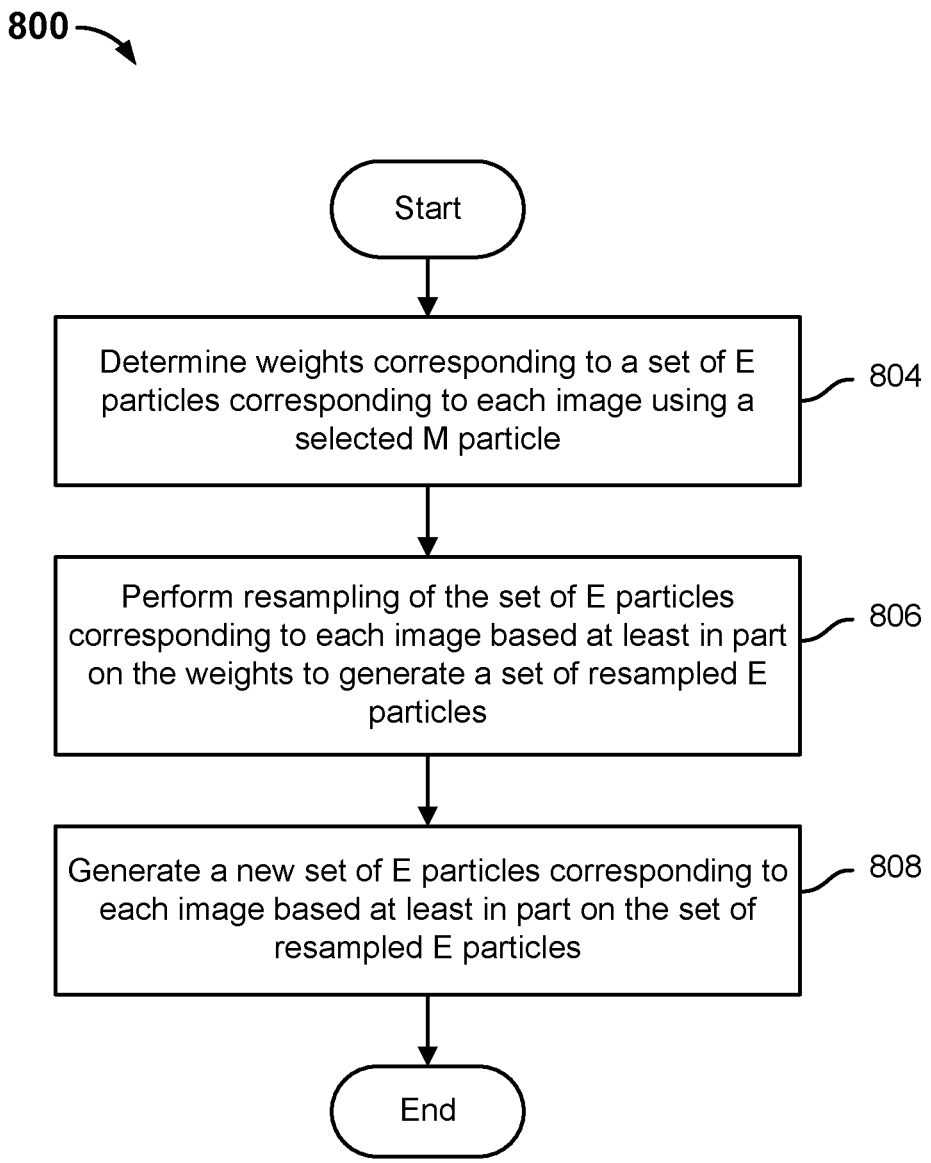
FIG. 8 is a flow diagram showing an example of a process of executing an extrinsic camera information (E) particle filter.

FIG. 8 is a flow diagram showing an example of a process of executing an extrinsic camera information (E) particle filter. In some embodiments, process 800 is implemented at system 100 of FIG. 1. In some embodiments, step 402 of process 400 of FIG. 4 can be implemented, at least in part, using process 800. In some embodiments, step 608 of process 600 of FIG. 6 can be implemented, at least in part, using process 800.

Process 800 describes an example process of executing one iteration of just the "E" particle filter to generate a new set of E particles corresponding to each image of the set of images.

Figure 9:
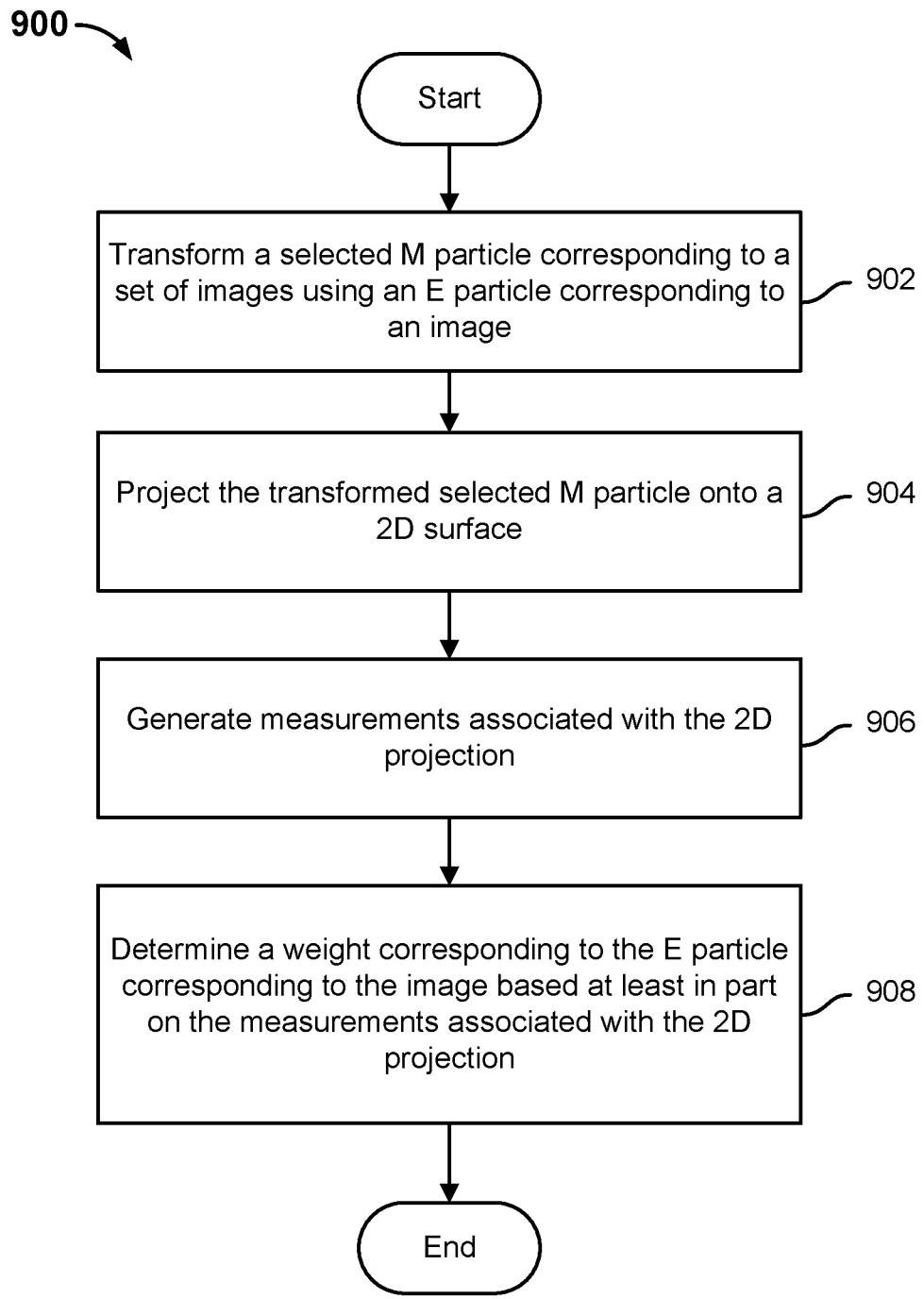
FIG. 9 is a flow diagram showing an example of a process of determining a weight corresponding to an E particle in an iteration of the extrinsic camera information (E) particle filter.

At 804, weights corresponding to a set of E particles corresponding to each image are determined using a selected M particle. A set of E particles corresponding to each image is either predetermined (e.g., based on historically generated sets of camera extrinsic information) or generated from a previous iteration of executing the E particle filter. There are a predetermined number of E particles corresponding to each image. For example, there are 50 E particles corresponding to each image. A weight (or score) is determined for each E particle corresponding to each image. The weight of an E particle associated with an image represents the probability that the E particle represents the correct/appropriate set of extrinsic camera information corresponding to that image. In various embodiments, a weight can be determined for an E particle using a selected M particle. In the event that the M particle filter has not executed before, the selected M particle can be a 3D model of a generic face or a historically determined 3D model of a historical user's face. Otherwise, in the event that the M particle filter has been executed before, the selected M particle can be an M particle selected from the set of M particles generated by the latest iteration of the M particle filter. Regardless of how the M particle is selected, it is considered to be "fixed" in the current iteration of the E particle filter. FIG. 9, below, describes an example process of determining a weight for an E particle corresponding to an image.

At 806, resampling of the set of E particles corresponding to each image is performed based at least in part on the weights to generate a set of resampled E particles. The set of E particles corresponding to each image is resampled based on the weights determined for the E particles. Resampling includes removing all E particles and creating new copies of a subset of the E particles associated with the highest weights to generate the same number (e.g., 50) of E particles that existed prior to the resampling. As such, an E particle with a higher weight may be reproduced more than once while an E particle with a low weight may not be reproduced at all.

Figure 10:
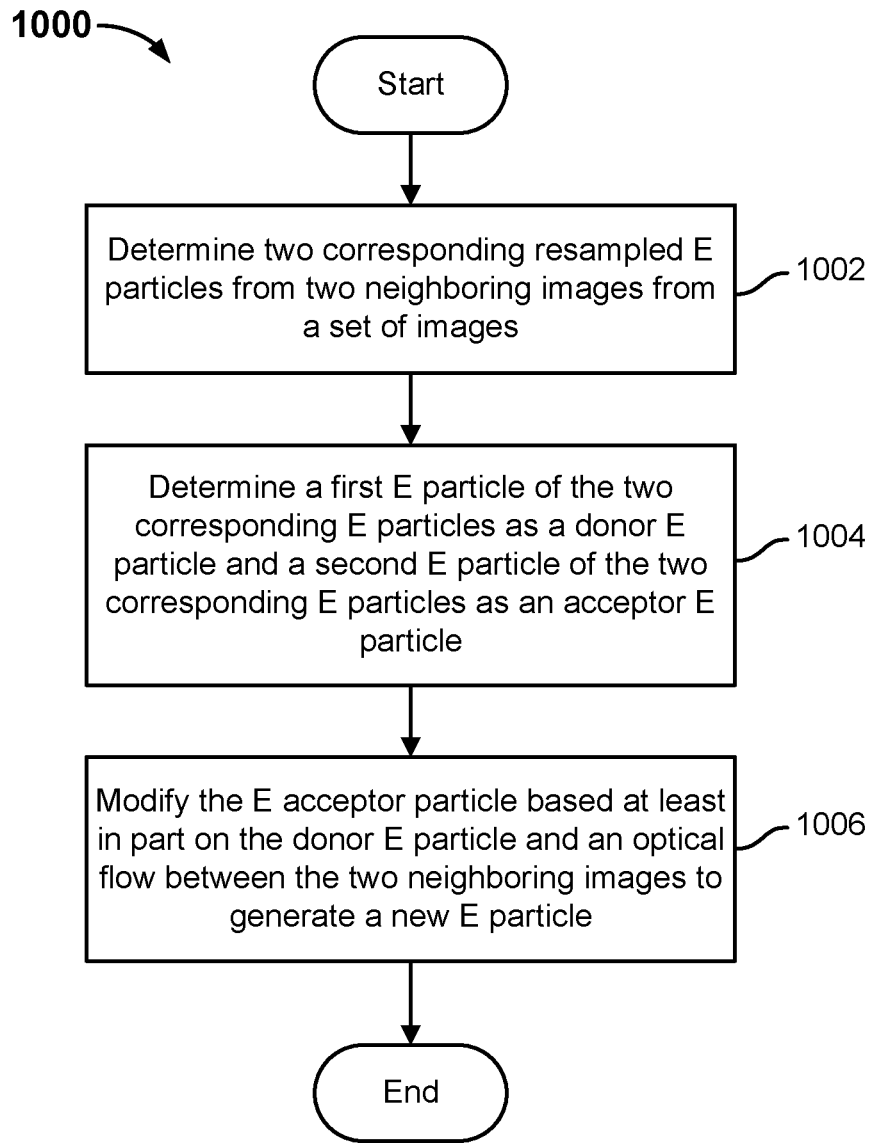
FIG. 10 is a flow diagram showing an example of a process of generating a new E particle using optical flow in an iteration of the extrinsic camera information (E) particle filter.
Figure 11:
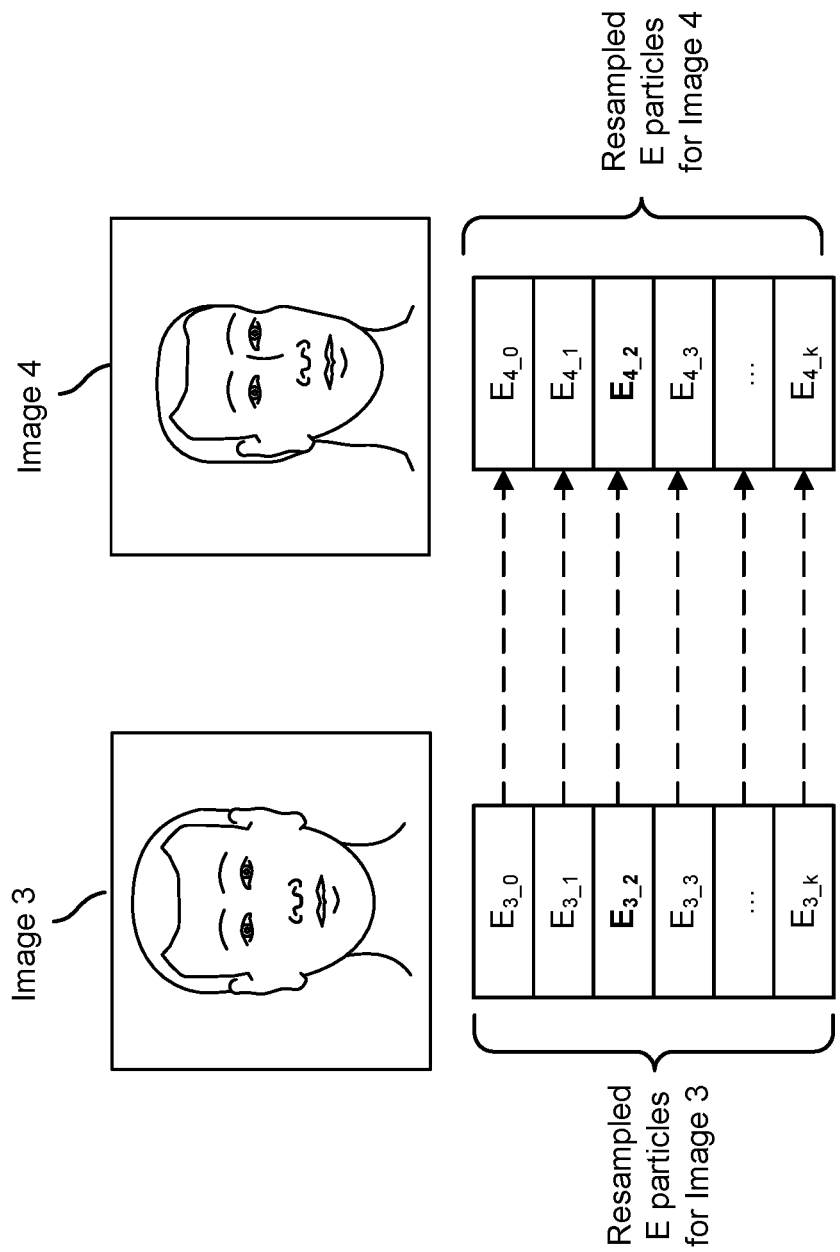
FIG. 11 is a diagram showing an example of generating a new E particle using optical flow in an iteration of the extrinsic camera information (E) particle filter.

At 808, a new set of E particles corresponding to each image is generated based at least in part on the set of resampled E particles. At least some of the resampled E particles corresponding to each image are modified (e.g., within a given tolerance) to create a new set of E particles from the resampled E particles. Modifying the resampled E particles adds variability into the E particles to potentially improve them (e.g., cause them to be closer to the correct set of extrinsic camera information corresponding to each image). FIGS. 10 and 11, below, describe examples of modifying a resampled E particle corresponding to an image. All of the new E particles have the same weight again.

FIG. 9 is a flow diagram showing an example of a process of determining a weight corresponding to an E particle in an iteration of the extrinsic camera information (E) particle filter. In some embodiments, process 900 is implemented at system 100 of FIG. 1. In some embodiments, step 804 of process 800 of FIG. 8 can be implemented, at least in part, using process 900.

Process 900 describes an example process of determining the weight of an E particle corresponding to an image. Process 900 can be repeated for each E particle associated with that image.

At 902, a selected M particle corresponding to a set of images is transformed using an E particle corresponding to an image. The selected M particle corresponding to a set of images is considered to be fixed in the current iteration of the E particle filter. The selected M particle comprises a 3D model of a face and as such, the 3D model of the face can be transformed by an E particle corresponding to an image. Since the E particle represents one or more rotation angles and also one or more translations that describe an orientation, the transformed 3D model of the face will be oriented based on the one or more rotation angles and also one or more translations of the E particle.

At 904, the transformed selected M particle is projected onto a 2D surface. The transformed selected M particle can be projected onto a 2D surface of the focal plane of a camera using a set of intrinsic information associated with the camera to obtain a 2D projection. In some embodiments, a set of intrinsic information corresponding to a camera describes a set of parameters associated with the camera. In some embodiments, the set of intrinsic information associated with the camera is predetermined.

At 906, measurements associated with the 2D projection are generated. The 2D projection can be thought of as a reconstructed image.

At 908, a weight corresponding to the E particle corresponding to the image is determined based at least in part on the measurements associated with the 2D projection.

In some embodiments, a feature detection measurement score can be generated for the E particle for the image from the 2D projection. For example, in using feature detection to generate measurements for the E particle corresponding to the image, the 2D coordinates of each of one or more facial features (e.g., eye corners, the nose tip, mouth corners, etc.) can be obtained from the 2D projection that is determined from projecting the transformed selected M particle onto a 2D surface. Each of the 2D coordinates of a facial feature can be used to look for the corresponding facial feature at the corresponding location of the original image. For example, each of the 2D coordinates is used to obtain an image patch from the original image centered at that coordinate and the image patch is fed into a feature detector. A confidence score is assigned by the feature detector for each facial feature based on whether that facial feature can be found in the original image at the original patch obtained based on the corresponding 2D coordinates that were determined from the 2D projection. An overall facial feature measurement score can be determined for the E particle for the image by combining (e.g., averaging) all the confidence scores corresponding to respective facial feature detectors.

In some embodiments, an optical flow measurement score can be generated for the E particle for the image from the 2D projection. Optical flow can be applied to two or more neighboring images of the set of images at a time. As described above, neighboring images comprise images that were recorded consecutively. Optical flow involves determining a grid of pixels for each of a first image and a second neighboring image, which is recorded after the first image. It is then determined how much, if any, each pixel has moved from the first image to the second image. For example, a first pixel position can be determined for each pixel on the first image and then a new pixel position can be determined for the same pixel on the second image and the distance as well as the direction between the first pixel position on the first image to the new pixel position on the second image can be calculated/measured. To determine an optical flow measurement for the E particle for the image from the 2D projection, a grid of pixels can be determined for the 2D projection corresponding to the image and a neighboring 2D projection determined from the selected M particle and a corresponding E particle associated with a neighboring image. Then the pixel movements from the 2D projection to the neighboring 2D projection can be determined. The pixel movements from the original image to the neighboring original image are also determined. The pixel movements from the two neighboring 2D projections and the pixel movements from the corresponding two original images are compared to determine an optical flow measurement score for the E particle for the image. For example, a corresponding optical flow measurement score for the E particle for the image can be determined based on the pixel movements between the image and each of its (up to) two neighboring images and the overall optical flow measurement score for the E particle for the image can be the combination (e.g., average) of those two optical flow measurement scores. For example, if the E particle for which the optical flow measurement score was being calculated were associated with index 2 and corresponded to image 10, then the overall optical flow measurement score for the E particle with index 2 of image 10 can be the average of 1) the optical flow measurement score for the E particles of index 2 determined between image 9 and image 10 and 2) the optical flow measurement score for the E particles of index 2 determined between image 10 and image 11.

In some embodiments, the weight corresponding to the E particle corresponding to the image can be determined based on combining the facial feature measurement score and the optical flow measurement score. For example, each of the facial feature measurement score and the optical flow measurement score corresponding to the E particle of the image can be normalized and then combined to determine the weight corresponding to the E particle corresponding to the image.

FIG. 10 is a flow diagram showing an example of a process of generating a new E particle using optical flow in an iteration of the extrinsic camera information (E) particle filter. In some embodiments, process 1000 is implemented at system 100 of FIG. 1. In some embodiments, step 808 of process 800 of FIG. 8 can be implemented, at least in part, using process 1000.

Process 1000 describes an example process of modifying a resampled E particle corresponding to an image to generate a new E particle corresponding to the image using optical flow, in which information is transferred in between the image and a neighboring image. Process 1000 can be repeated for each pair of corresponding particles in two neighboring images. In a set of images, some images may be better than others in the sense that certain images may be less blurry and/or show more facial features than other images. By using optical flow to transfer information between E particles corresponding to two neighboring images, the modified E particles can provide better hypotheses of the desired sets of extrinsic camera information corresponding to the images. As described above, in some embodiments, because the initial set of E particles are randomly generated from a historically determined distribution, many of such E particles are incorrect. As such, when an E particle corresponding to an image is determined to receive a higher score/weight (e.g., as determined using a process such as process 800 of FIG. 8), then that E particle will have the opportunity to pass information along the gradient of optical flow to neighboring images, especially when the neighboring images do not have E particles (hypotheses) with high scores/weights.

At 1002, two corresponding resampled E particles are determined from two neighboring images from a set of images. As described above, two neighboring images comprise two images that were recorded one image after the other image. It is assumed that the E particles corresponding to each of the two neighboring images are the resampled E particles and each resampled E particle is associated with a weight. In some embodiments, the two corresponding E particles, one of which belongs to a first of the two images and the other of which belongs to a second of the two images comprise E particles associated with the same index.

At 1004, a first E particle of the two corresponding resampled E particles is determined as a donor E particle and a second E particle of the two corresponding resampled E particles is determined as an acceptor E particle. In some embodiments, one of the two corresponding E particles is stochastically determined to be a donor E particle and the other of the two corresponding E particles is stochastically determined to be an acceptor E particle.

At 1006, the E acceptor particle is modified based at least in part on the donor E particle and an optical flow between the two neighboring images to generate a new E particle. The acceptor E particle is modified based on the donor E particle and an optical flow between the two neighboring images to generate a new E particle.

FIG. 11 is a diagram showing an example of generating a new E particle using optical flow in an iteration of the extrinsic camera information (E) particle filter. Image 3 and Image 4 are neighboring images in a set of images (the set of images may include other images that are not shown). Assume that in this example, Image 4 was recorded after Image 3. As shown in FIG. 11, k resampled E particles have been determined for each of Image 3 and Image 4. For example, the resampled E particles for Image 3 include $E_{3\_0}$, $E_{3\_1}$, $E_{3\_2}$, $E_{3\_3}$, and $E_{3\_k}$ and the resampled E particles for Image 3 include $E_{4\_0}$, $E_{4\_1}$, $E_{4\_2}$, $E_{4\_3}$, and $E_{4\_k}$. Assume that E particles in index 2 for both Image 3 and Image 4 ($E_{3\_2}$ and $E_{4\_2}$) are corresponding E particles. In the example, each E particle comprises a six dimensional vector with three rotation angles and three translations (e.g., three coordinates).

The following is a step-by-step example of modifying the pair of corresponding E particles from Image 3 and Image 4:

Assume that the weights corresponding to corresponding particles $E_{3\_2}$ and $E_{4\_2}$ are as follows:

Weight_$E_{3\_2}$=0.5

Weight_$E_{4\_2}$=0.9

1. For example, a dice that is weighted by the respective weights of the two corresponding particles is tossed and it is determined that particle $E_{4\_2}$ is a donor particle and $E_{3\_2}$ is an acceptor particle (because Image 4 comprises the better of the two images).

2. A single gradient descent step from the donor particle, particle $E_{4\_2}$, is calculated: particle $E_{4\_2}'$=(particle $E_{4\_2}$)−α*gradient(E)

3. Noise is added to the acceptor particle, particle $E_{3\_2}$: particle $E_{3\_2}'$=(particle $E_{3\_2}$)+noise 4. A new value based on a combination of the results of the previous two steps is computed to replace the original value of the acceptor particle, particle $E_{3\_2}$:

$$\text{particle } E_{3\_2} = \{[0.5*(\text{particle } E_{3\_2}')] + [0.9*(\text{particle } E_{4\_2}')]\}/(0.9+0.5)$$

The acceptor particle, particle $E_{3\_2}$, with the new value can be referred to as a new E particle.

Figure 12:
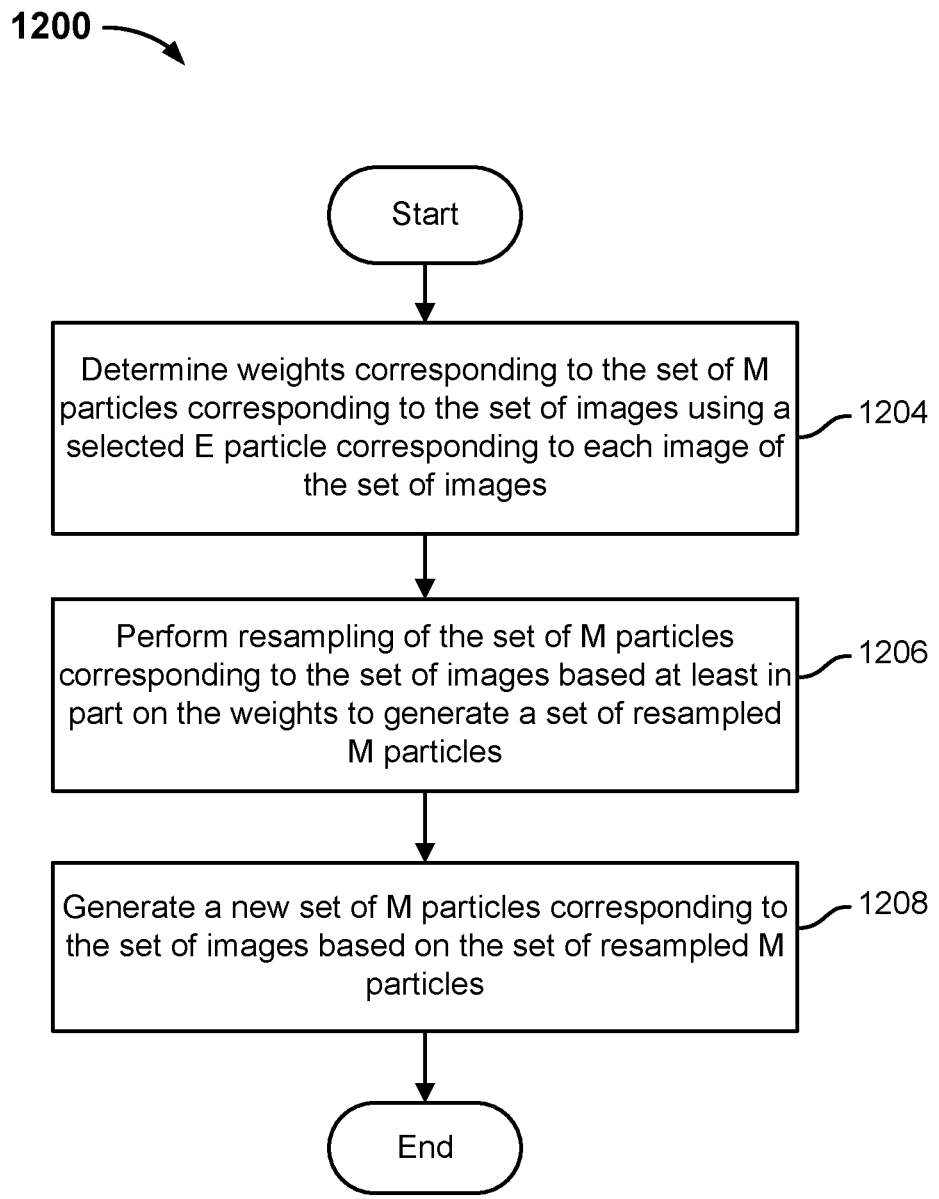
FIG. 12 is a flow diagram showing an example of a process of executing a 3D model of a user's face model (M) particle filter.

FIG. 12 is a flow diagram showing an example of a process of executing a 3D model of a user's face model (M) particle filter. In some embodiments, process 1200 is implemented at system 100 of FIG. 1. In some embodiments, step 406 of process 400 of FIG. 4 can be implemented, at least in part, using process 1200. In some embodiments, step 612 of process 600 of FIG. 6 can be implemented, at least in part, using process 1200.

Process 1200 describes an example process of executing one iteration of just the "M" particle filter to determine a new set of M particles corresponding to a set of images.

Figure 13:
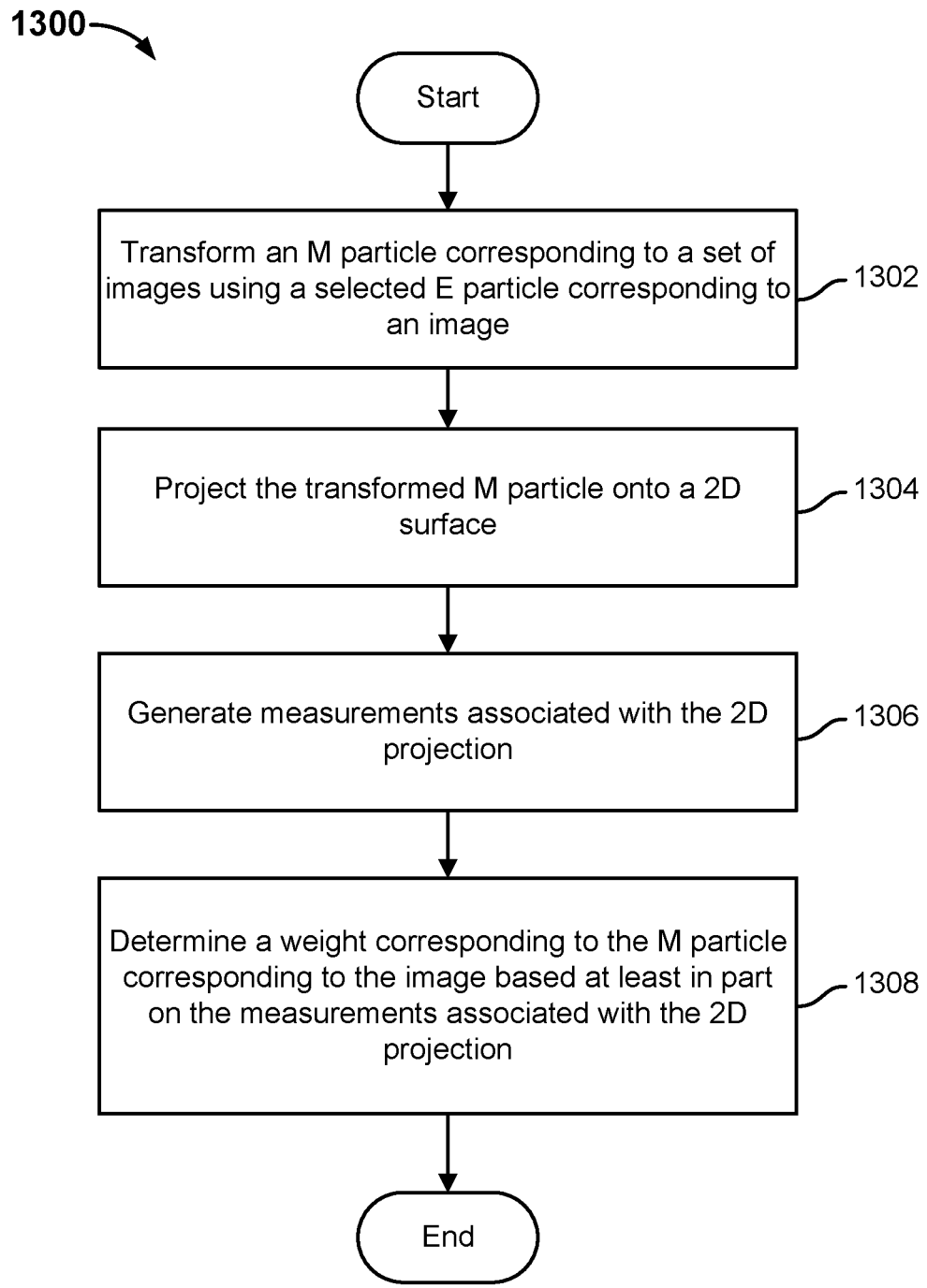
FIG. 13 is a flow diagram showing an example of a process of determining a weight corresponding to an M particle in an iteration of the 3D model of a user's face model (M) particle filter.

At 1204, weights corresponding to a set of M particles corresponding to the set of images are determined using a selected E particle corresponding to each image of the set of images. A set of M particles corresponding to the set of images is either predetermined (e.g., based on historically generated 3D models of historical users' faces) or generated from a previous iteration of executing the M particle filter. There are a predetermined number of M particles corresponding to the set of images. For example, there are 30 M particles corresponding to the set of images. A weight (or a score) is determined for each M particle corresponding to the set of images. The weight of an M particle associated with the set of images represents the probability that the M particle represents the correct/appropriate 3D model of the user's face corresponding to the set of images. In various embodiments, a weight can be determined for an M particle using a selected E particle corresponding to each image of the set of images. In the event that the E particle filter has not executed before, the selected E particle corresponding to each image can be a historically determined set of extrinsic camera information. Otherwise, in the event that the E particle filter has been executed before, the selected E particle corresponding to each image can be an E particle selected from the set of E particles for each image generated by the latest iteration of the E particle filter. Regardless of how the E particle corresponding to each image is selected, they are considered to be "fixed" in the current iteration of the M particle filter. FIG. 13, below, describes an example process of determining a weight for an M particle corresponding to a set of images.

At 1206, resampling of the set of M particles corresponding to the set of images is performed based at least in part on the weights to generate a set of resampled M particles. The set of M particles corresponding to the set of images is resampled based on the weights determined for the M particles. Resampling includes removing all M particles and creating new copies of a subset of the M particles associated with the highest weights to generate the same number (e.g., 30) of M particles that existed prior to the resampling. As such, an M particle with a higher weight may be reproduced more than once while an M particle with a low weight may not be reproduced at all.

Figure 14:
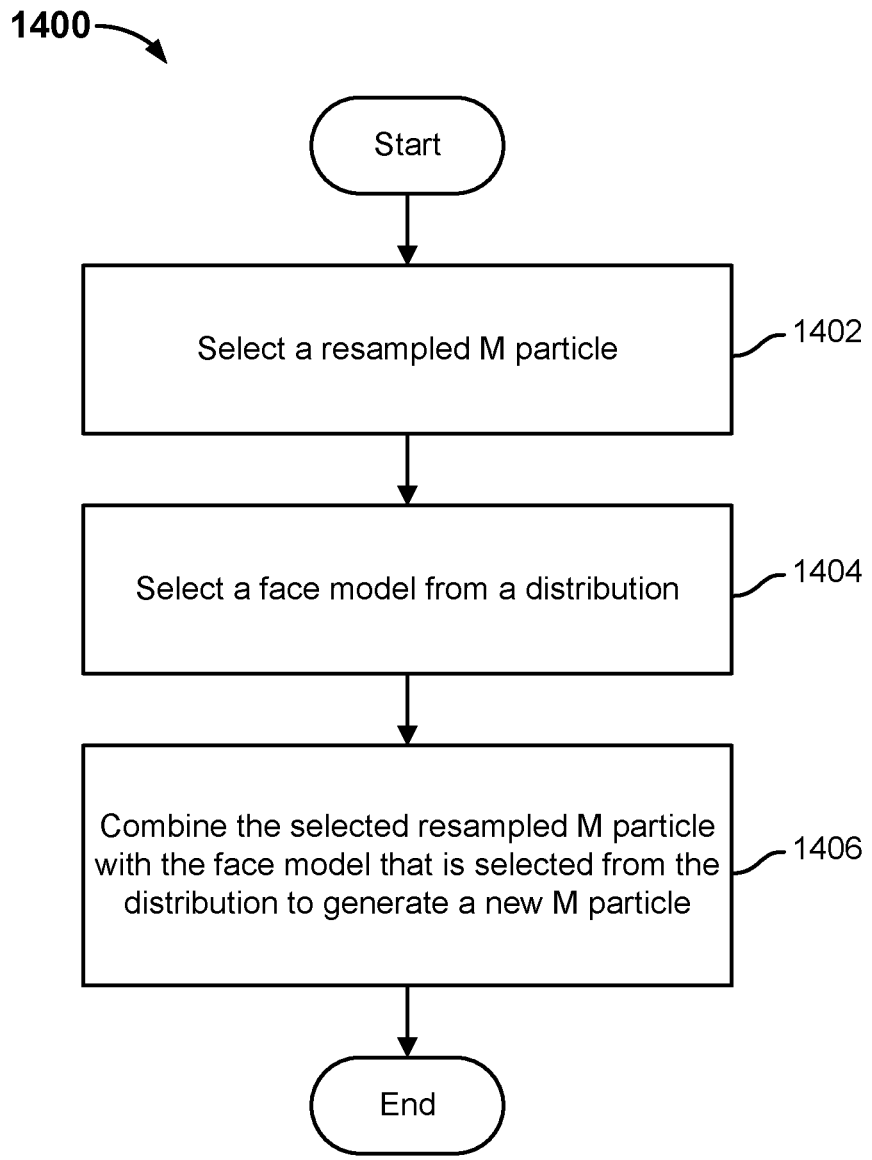
FIG. 14 is a flow diagram showing an example of a process of generating a new M particle in an iteration of the 3D model of a user's face model (M) particle filter.

At 1208, a new set of M particles corresponding to the set of images is generated based at least in part on the set of resampled M particles. At least some of the resampled M particles corresponding to the set of images are modified (e.g., within a given tolerance) to create a new set of M particles from the resampled M particles. Modifying the resampled M particles adds variability into the M particles to potentially improve them (e.g., cause them to be closer to the correct 3D model of the user's face corresponding to the set of images). FIG. 14, below, describes an example of modifying a resampled M particle corresponding to a set of images. All of the new M particles have the same weight again.

FIG. 13 is a flow diagram showing an example of a process of determining a weight corresponding to an M particle in an iteration of the 3D model of a user's face model (M) particle filter. In some embodiments, process 1300 is implemented at system 100 of FIG. 1. In some embodiments, step 1204 of process 1200 of FIG. 12 can be implemented, at least in part, using process 1300.

Process 1300 describes an example process of determining the weight of an M particle corresponding to one image of a set of images. Process 1300 can be repeated for the same M particle corresponding to each image of the set of images. Process 1300 can be accordingly repeated for each M particle associated with the set of images.

At 1302, an M particle corresponding to a set of images is transformed using a selected E particle corresponding to an image. The selected E particle corresponding to each image of the set of images is considered to be fixed in the current iteration of the M particle filter. The M particle comprises a 3D model of a face and as such, the 3D model of the face can be transformed by a selected E particle corresponding to each image. Since each selected E particle represents one or more rotation angles and also one or more translations that describe an orientation, the transformed 3D model of the face will be oriented based on the one or more rotation angles and also one or more translations associated with the selected E particle.

At 1304, the transformed M particle is projected onto a 2D surface. The transformed M particle can be projected onto a 2D surface of the focal plane of a camera using a set of intrinsic information associated with the camera to obtain a 2D projection. In some embodiments, a set of intrinsic information corresponding to a camera describes a set of parameters associated with the camera. In some embodiments, the set of intrinsic information associated with the camera is predetermined.

At 1306, measurements associated with the 2D projection are generated. The 2D projection can be thought of as a reconstructed image.

At 1308, a weight corresponding to the M particle corresponding to the image is determined based at least in part on the measurements associated with the 2D projection.

In some embodiments, a feature detection measurement score can be generated for the M particle for the image from the 2D projection. For example, in using feature detection to generate measurements for the M particle corresponding to the image, the 2D coordinates of each of one or more facial features (e.g., eye corners, the nose tip, mouth corners, etc.) can be obtained from the 2D projection that is determined from projecting the transformed M particle onto a 2D surface. Each of the 2D coordinates of a facial feature can be used to look for the corresponding facial feature at the corresponding location of the original image. For example, each of the 2D coordinates is used to obtain an image patch from the original image centered at that coordinate and the image patch is fed into a feature detector. A confidence score is assigned by the feature detector for each facial feature based on whether that facial feature can be found in the original image at the original patch obtained based on the corresponding 2D coordinates that were determined from the 2D projection. An overall facial feature measurement score can be determined for the M particle for the image by combining (e.g., averaging) all the confidence scores corresponding to respective facial feature detectors.

In some embodiments, an optical flow measurement score can be generated for the M particle for the image from the 2D projection. Optical flow can be applied to two or more neighboring images of the set of images at a time. As described above, neighboring images comprise images that were recorded consecutively. Optical flow involves determining a grid of pixels for each of a first image and a second neighboring image, which is recorded after the first image. It is then determined how much, if any, each pixel has moved from the first image to the second image. For example, a first pixel position can be determined for each pixel on the first image and then a new pixel position can be determined for the same pixel on the second image and the distance as well as direction between the first pixel position on the first image to the new pixel position on the second image can be calculated/measured. To determine an optical flow measurement for the M particle for the image from the 2D projection, a grid of pixels can be determined for the 2D projection corresponding to the image and a neighboring 2D projection determined from the M particle and a fixed E particle associated with a neighboring image. Then the pixel movements from the 2D projection to the neighboring 2D projection can be determined. The pixel movements from the original image to the neighboring original image are also determined. The pixel movements from the two neighboring 2D projections and the pixel movements from the corresponding two original images are compared to determine an optical flow measurement score for the M particle for the image. For example, a corresponding optical flow measurement score for the M particle for the image can be determined based on the pixel movements between the image and each of its (up to) two neighboring images and the overall optical flow measurement score for the M particle for the image can be the combination (e.g., average) of those two optical flow measurement scores. For example, if the M particle for which the optical flow measurement score was being calculated corresponded to image 10, then the overall optical flow measurement score for the M particle with respect to image 10 can be the average of 1) the optical flow measurement score for the M particle determined between image 9 and image 10 and 2) the optical flow measurement score for the M particle determined between image 10 and image 11.

In some embodiments, the weight corresponding to the M particle corresponding to the image can be determined based on combining the facial feature measurement score and the optical flow measurement score with respect to the M particle for that image. For example, each of the facial feature measurement score and the optical flow measurement score corresponding to the M particle with respect to the image can be normalized and then combined to determine the weight corresponding to the M particle corresponding to the image.

As there are typically multiple images in a set of images and a corresponding weight of the M particle can be determined for each image, in some embodiments, the overall weight of the M particle corresponding to the set of images can be determined based on all the weights corresponding to the respective images. For example, the overall weight of the M particle can be determined as a geometric average or a median of the weights corresponding to at least a subset of all the images.

FIG. 14 is a flow diagram showing an example of a process of generating a new M particle in an iteration of the 3D model of a user's face model (M) particle filter. In some embodiments, process 1400 is implemented at system 100 of FIG. 1. In some embodiments, step 1208 of process 1200 of FIG. 12 can be implemented, at least in part, using process 1400.

Process 1400 describes an example process of modifying a resampled M particle corresponding to a set of images to generate a new M particle corresponding to the set of images. Process 1400 can be repeated for each resampled M particle corresponding to the set of images.

At 1402, a resampled M particle is selected. A resampled M particle to modify is selected.

At 1404, a face model is selected from a distribution. While it is desirable to modify the resampled M particle, it is also desired to not modify the resampled M particle in a manner that would cause the resulting 3D model of a face to no longer resemble a human face. As such, a 3D face model from a distribution of historically determined 3D models of historical users' faces may be (e.g., randomly) selected to combine with the resampled M particle to ensure that the resulting face will not deviate too much from a human face. Put another way, by combining the resampled M particle with a previously determined 3D model of a historical user's face, it is ensured that the modifications to the resampled M particle will not be too random and result in a face that does not have realistic human facial features.

At 1406, the selected resampled M particle is combined with the face model that is selected from the distribution to generate a new M particle. For example, the resampled M particle can be averaged with the selected 3D face model from the distribution to create a new M particle. For example, if $M_k$ represented the resampled M particle, $M_n$ represented the 3D face model selected from the distribution, and $\theta$ represented a predetermined constant/parameter (e.g., that is selected to be less than one), then the new M particle, $M_k'$, can be expressed by the following example formula:

$$M_k' = \theta * M_k + (1-\theta) * M_n \quad (1)$$

Embodiments of using particle filters to construct a user's face as described herein provide advantages over conventional techniques such as bundle adjustment. For example, particle filters require fewer reference points from a set of images as input than a bundle adjustment technique and is therefore more efficient. Furthermore, while a set of images may include some blurriness, using particle filters with optical flow exploits the flow of information between neighboring images, which conventional techniques do not necessarily consider. In addition, particle filters can be efficiently implemented using parallel threads, which can reduce overall computational time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a plurality of face images of a face at various orientations;
apply an extrinsic camera particle filter to determine a plurality of sets of extrinsic camera information particles corresponding to respective ones of the plurality of face images based at least in part on a first selected face model particle and at least one previously obtained set of extrinsic camera information particles including by, for an image in the plurality of face images:
performing resampling on the at least one previously obtained set of extrinsic camera information particles corresponding to the image based at least in part on weights corresponding to the at least one previously obtained set of extrinsic camera information particles, to generate resampled previously obtained extrinsic camera information particles corresponding to the image; and
determining the plurality of sets of extrinsic camera information particles corresponding to the image based at least in part on the resampled previously obtained extrinsic camera information particles corresponding to the image;
select a subset of the plurality of sets of extrinsic camera information particles corresponding to respective ones of the plurality of face images;
apply a face model particle filter to determine a plurality of face model particles corresponding to the plurality of face images based at least in part on the selected subset of the plurality of sets of extrinsic camera information particles and a previous set of face model particles;
determine a 3D face model based at least in part on the first plurality of face model particles; and
a memory coupled to the processor and configured to provide the processor with instructions.

2. The system of claim 1, wherein the first selected face model particle comprises a model of a generic face.

3. The system of claim 1, wherein the first selected face model particle comprises a historical 3D face model.

4. The system of claim 1, wherein the processor is further configured to select an initial plurality of sets of extrinsic camera information particles corresponding to respective ones of the plurality of face images from a distribution of historical sets of extrinsic camera information.

5. The system of claim 1, wherein the processor is further configured to select an initial plurality of face model particles from a distribution of historical 3D face models.

6. The system of claim 1, wherein the processor is further configured to select an initial plurality of face model particles from a distribution of generic faces.

7. The system of claim 1, wherein the weights are determined at least in part by:
transforming the first selected face model particle using a previously obtained set of extrinsic camera information particles corresponding to the image;
projecting the transformed first selected face model particle onto a two-dimensional (2D) surface to generate a 2D projection;
generating measurements associated with the 2D projection; and
determining a weight corresponding to the at least one previously obtained set of extrinsic camera information particles corresponding to the first image based at least in part on the measurements associated with the 2D projection.

8. The system of claim 1, wherein determining the plurality of sets of extrinsic camera information particles corresponding to the image based at least in part on the resampled previously obtained sets of extrinsic camera information particles corresponding to the image comprises to:
determine two corresponding resampled previously obtained sets of extrinsic camera information particles from two neighboring images, wherein the two neighboring images include the image;
determine a first previously obtained set of extrinsic camera information particle of the two corresponding previously obtained sets of extrinsic camera information particles as a donor particle and a second previously obtained set of extrinsic camera information particle of the two corresponding previously obtained sets of extrinsic camera information particles as an acceptor particle; and
modify the acceptor particle based at least in part on the donor particle and an optical flow between the two neighboring images to output a new set of extrinsic camera information particle corresponding to the image.

9. The system of claim 1, wherein applying the face model particle filter includes:
performing resampling on the previous set of face model particles corresponding to the plurality of face images based at least in part on weights corresponding to the at least one previously obtained set of extrinsic camera information particles, to generate resampled previously obtained plurality of face model particles; and
outputting the plurality of face model particles corresponding to the plurality of face images based at least in part on the resampled previously obtained plurality of face model particles corresponding to the plurality of face images.

10. The system of claim 9, wherein the weights are determined at least in part by:
transforming a previously obtained face model particle using a selected set of extrinsic camera information particle corresponding to a second image;
projecting the transformed face model particle onto a two-dimensional (2D) surface to generate a 2D projection;
generating measurements associated with the 2D projection; and
determining a weight corresponding to the previously obtained face model particle based at least in part on the measurements associated with the 2D projection.

11. The system of claim 9, wherein to output the plurality of face model particles corresponding to the plurality of face images based at least in part on the resampled previously obtained plurality of face model particles corresponding to the plurality of face images comprises to:
select a resampled previously obtained face model particle;
select a face model from a distribution of face models; and
combine the selected resampled previously obtained face model particle with the face model that is selected from the distribution to output a new face model particle.

12. A method, comprising:
receiving a plurality of face images of a face at various orientations;
applying an extrinsic camera particle filter to determine a first plurality of sets of extrinsic camera information particles corresponding to respective ones of the plurality of face images based at least in part on a first selected face model particle and at least one previously obtained set of extrinsic camera information particles including by, for an image in the plurality of face images:
performing resampling on the at least one previously obtained set of extrinsic camera information particles corresponding to the image based at least in part on weights corresponding to the at least one previously obtained set of extrinsic camera information particles, to generate resampled previously obtained extrinsic camera information particles corresponding to the image; and
determining the plurality of sets of extrinsic camera information particles corresponding to the image based at least in part on the resampled previously obtained extrinsic camera information particles corresponding to the image;
selecting a subset of the plurality of sets of extrinsic camera information particles corresponding to respective ones of the plurality of face images;
applying a face model particle filter to determine a plurality of face model particles corresponding to the plurality of face images based at least in part on the selected subset of the plurality of sets of extrinsic camera information particles and a previous set of face model particles;
determining a 3D face model based at least in part on the first plurality of face model particles.

13. The method of claim 12, wherein the weights are determined at least in part by:
transforming the first selected face model particle using a previously obtained set of extrinsic camera information particles corresponding to the image;
projecting the transformed first selected face model particle onto a two-dimensional (2D) surface to generate a 2D projection;
generating measurements associated with the 2D projection; and
determining a weight corresponding to the at least one previously obtained set of extrinsic camera information particles corresponding to the image based at least in part on the measurements associated with the 2D projection.

14. The method of claim 12, wherein the new determining the plurality of sets of extrinsic camera information particles corresponding to the image based at least in part on the resampled previously obtained sets of extrinsic camera information particles corresponding to the image comprises to:
determine two corresponding resampled previously obtained sets of extrinsic camera information particles from two neighboring images, wherein the two neighboring images include the image;

determine a first previously obtained set of extrinsic camera information particle of the two corresponding previously obtained sets of extrinsic camera information particles as a donor particle and a second previously obtained set of extrinsic camera information particle of the two corresponding previously obtained sets of extrinsic camera information particles as an acceptor particle; and modify the acceptor particle based at least in part on the donor particle and an optical flow between the two neighboring images to output a new set of extrinsic camera information particle corresponding to the image.

15. The method of claim 12, wherein applying the face model particle filter includes:

performing resampling on the previous set of face model particles corresponding to the plurality of face images based at least in part on weights corresponding to the previous at least one previously obtained set of extrinsic camera information particles, to generate resampled previously obtained plurality of face model particles; and outputting the plurality of face model particles corresponding to the plurality of face images based at least in part on the resampled previously obtained plurality of face model particles corresponding to the plurality of face images.

16. The method of claim 15, wherein the weights are determined at least in part by:

transforming a previously obtained face model particle using a selected set of extrinsic camera information particle corresponding to a second image;

projecting the transformed face model particle onto a two-dimensional (2D) surface to generate a 2D projection;

generating measurements associated with the 2D projection; and determining a weight corresponding to the previously obtained face model particle based at least in part on the measurements associated with the 2D projection.

17. The method of claim 15, wherein to output the plurality of face model particles corresponding to the plurality of face images based at least in part on the resampled previously obtained plurality of face model particles corresponding to the plurality of face images comprises to:

select a resampled previously obtained face model particle;

select a face model from a distribution of face models; and combine the selected resampled face model particle with the face model that is selected from the distribution to output a new face model particle.

18. A computer program product, the computer program product being embodied in a non-transitory computer readable storage medium and comprising computer instructions for:

receiving a plurality of face images of a face at various orientations;

applying an extrinsic camera particle filter to determine a plurality of sets of extrinsic camera information particles corresponding to respective ones of the plurality of face images based at least in part on a first selected face model particle and at least one previously obtained set of extrinsic camera information particles including by, for an image in the plurality of face images:

performing resampling on the at least one previously obtained set of extrinsic camera information particles corresponding to the image based at least in part on weights corresponding to the at least one previously obtained set of extrinsic camera information particles, to generate resampled previously obtained extrinsic camera information particles corresponding to the image; and determining the plurality of sets of extrinsic camera information particles corresponding to the image based at least in part on the resampled previously obtained extrinsic camera information particles corresponding to the image;

selecting a subset of the plurality of sets of extrinsic camera information particles corresponding to respective ones of the plurality of face images;

applying a face model particle filter to determine a plurality of face model particles corresponding to the plurality of face images based at least in part on the selected subset of the plurality of sets of extrinsic camera information particles and a previous set of face model particles;

determining a 3D face model based at least in part on the plurality of face model particles.

* * * * *

UNITED STATES PATENT AND TRADEMARK OFFICE
CERTIFICATE OF CORRECTION

| | | |
|---|---|---|
| PATENT NO. | : 10,791,321 B2 | Page 1 of 1 |
| APPLICATION NO. | : 16/555936 | |
| DATED | : September 29, 2020 | |
| INVENTOR(S) | : Sergey Surkov | |

It is certified that error appears in the above-identified patent and that said Letters Patent is hereby corrected as shown below:

In the Specification

In Column 11, Line(s) 32, delete "Mixed" and insert --$M_{fixed}$--, therefor.

In the Claims

In Column 20, Line(s) 50, Claim 1, delete "first".

In Column 21, Line(s) 13, Claim 7, delete "first".

In Column 22, Line(s) 13, Claim 12, delete "first".

In Column 22, Line(s) 44, Claim 12, delete "first".

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*